US012793187B2

(12) United States Patent
Chou

(10) Patent No.: US 12,793,187 B2
(45) Date of Patent: Nov. 10, 2026

(54) SYSTEM AND METHODS FOR DEPTH-AWARE VIDEO PROCESSING AND DEPTH PERCEPTION ENHANCEMENT

(71) Applicant: Huawei Technologies Co., Ltd., Shenzhen (CN)

(72) Inventor: Chih-Hsien Chou, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 18/658,929

(22) Filed: May 8, 2024

(65) Prior Publication Data

US 2024/0296531 A1 Sep. 5, 2024

Related U.S. Application Data

(63) Continuation of application No. PCT/US2021/058532, filed on Nov. 9, 2021.

(51) Int. Cl.
*G06T 5/73* (2024.01)
*G06F 3/01* (2006.01)
(Continued)

(52) U.S. Cl.
CPC ................ *G06T 5/73* (2024.01); *G06F 3/011* (2013.01); *G06T 5/20* (2013.01); *G06T 7/13* (2017.01);
(Continued)

(58) Field of Classification Search
CPC .... G06T 5/73; G06T 7/50; G06T 7/13; G06T 5/20; G06T 11/001; G06T 2207/20192; G06F 3/011
See application file for complete search history.

(56) References Cited

U.S. PATENT DOCUMENTS 9,007,435 B2 * 4/2015 Chen .......................... G06T 5/73 382/167
2012/0293615 A1 * 11/2012 Chen .......................... G06T 5/73 382/167
(Continued)

OTHER PUBLICATIONS

Hessel, Charles, and Jean-Michel Morel. "Quantitative evaluation of base and detail decomposition filters based on their artifacts." arXiv preprint arXiv:1808.09411 (2018). (Year: 2018).*
(Continued)

*Primary Examiner* — Yu Chen
(74) *Attorney, Agent, or Firm* — Conley Rose, P.C.

(57) ABSTRACT

Implementations are directed to methods, systems, and computer-readable media for obtaining imaging data, obtaining a depth map and a scene lighting mode vector characterizing a scene lighting of the imaging data, generating edge emphasis signals by a depth edge filtering process, generating detail signals and a base signal by a joint three-dimensional (3D) spatial-depth-value filtering process, generating, from the edge emphasis signals, the detail signals, and the base signal and using the scene lighting mode vector and the depth values, depth-aware processed signals including depth-aware enhanced edge emphasis signals, depth-aware enhanced detail signals, and depth-aware converted base signal, generating, from the depth-aware processed signals, depth-aware enhanced imaging data, and providing the depth-aware enhanced imaging data for display on a display device.

17 Claims, 8 Drawing Sheets

(51) Int. Cl.
*G06T 5/20* (2006.01)
*G06T 7/13* (2017.01)
*G06T 7/50* (2017.01)
*G06T 11/10* (2026.01)

(52) U.S. Cl.
CPC ................ *G06T 7/50* (2017.01); *G06T 11/10* (2026.01); *G06T 2207/20192* (2013.01)

(56) References Cited

U.S. PATENT DOCUMENTS

| | | | | |
|---|---|---|---|---|
| 2013/0009952 | A1 | 1/2013 | Tam et al. | |
| 2015/0254811 | A1 | 9/2015 | Sahu et al. | |
| 2015/0302592 | A1* | 10/2015 | Bruls | G06T 7/50 348/44 |
| 2017/0178305 | A1 | 6/2017 | Silver et al. | |
| 2018/0324465 | A1* | 11/2018 | Aydin | H04N 19/51 |
| 2019/0037137 | A1* | 1/2019 | Toksvig | H04N 21/816 |
| 2019/0139179 | A1* | 5/2019 | Wang | G06N 3/0895 |
| 2020/0286213 | A1 | 9/2020 | Unger et al. | |
| 2020/0302686 | A1* | 9/2020 | Totty | G06T 7/174 |
| 2021/0383590 | A1* | 12/2021 | Roimela | H04N 19/597 |
| 2022/0020128 | A1* | 1/2022 | Roy | G06T 5/94 |
| 2022/0051412 | A1* | 2/2022 | Gronau | G06V 40/172 |
| 2023/0377183 | A1* | 11/2023 | Wantland | G06T 19/006 |
| 2024/0151896 | A1* | 5/2024 | Karafin | G02B 27/0172 |
| 2024/0296605 | A1* | 9/2024 | Kozlov | G06T 15/005 |

OTHER PUBLICATIONS

Farbman, Zeev, et al. "Edge-preserving decompositions for multi-scale tone and detail manipulation." ACM transactions on graphics (TOG) 27.3 (2008): 1-10. (Year: 2008).*

Lo, Kai-Han, Yu-Chiang Frank Wang, and Kai-Lung Hua. "Joint trilateral filtering for depth map super-resolution." 2013 Visual Communications and Image Processing (VCIP). IEEE, 2013. (Year: 2013).*

Xie, Haoran, et al. "Joint weighted least squares for normal decomposition of 3D measurement surface." Measurement Science and Technology 31.4 (2020): 045401. (Year: 2020).*

Ng, Kim C., Jinglin Shen, and Chiu Man Ho. "A System for Fusing Color and Near-Infrared Images in Radiance Domain." Proceedings of the IEEE/CVF International Conference on Computer Vision. 2021. (Year: 2021).*

International Search Report and Written Opinion dated Jan. 31, 2022, International Application No. PCT/US2021/058532, 16 pages.

* cited by examiner

SYSTEM AND METHODS FOR DEPTH-AWARE VIDEO PROCESSING AND DEPTH PERCEPTION ENHANCEMENT

CLAIM OF PRIORITY

This application is a continuation of, and claims priority to, PCT Patent Application No. PCT/US2021/058532, entitled "SYSTEM AND METHODS FOR DEPTH-AWARE VIDEO PROCESSING AND DEPTH PERCEPTION ENHANCEMENT", filed Nov. 9, 2021, which application is incorporated by reference herein in its entirety.

TECHNICAL FIELD

This specification generally relates to video/image processing for generation of video/images presented on two-dimensional (2D) single- or multi-view displays.

BACKGROUND

Enhancement of video/imaging data can improve user viewing experience in static and interactive displays as well as improve detection, recognition, and identification of objects and scenes in the video/imaging data.

Computational techniques can be utilized to decompose an image (e.g., in a photograph or a video) into a piecewise smooth base layer which contains large scale variations in intensity while preserving salient edges and a residual detail layer capturing the smaller scale details in the image. Computational techniques, e.g., multiscale base-detail decompositions, can control for the spatial scale of the extracted details and manipulate details at multiple scales while avoiding visual artifacts.

SUMMARY

As described in greater detail throughout this specification, implementations of the present disclosure can utilize depth map information in combination with depth-aware filtering, processing, and enhancement modulation to generate enhanced video/images presented on two-dimensional (2D) single- or multi-view displays.

In some implementations, methods can include obtaining imaging data, obtaining a depth map including multiple depth values for the imaging data and a scene lighting mode vector characterizing a scene lighting of the imaging data, generating, using the multiple depth values, multiple edge emphasis signals by a depth edge filtering process, generating, using the imaging data and the multiple depth values, multiple detail signals and a base signal by a joint three-dimensional (3D) spatial-depth-value filtering process, generating, from the multiple edge emphasis signals, the multiple detail signals, and the base signal and using the scene lighting mode vector and the multiple depth values, multiple depth-aware processed signals, were the multiple depth-aware processed signals include depth-aware enhanced edge emphasis signals, depth-aware enhanced detail signals, and depth-aware converted base signal, generating, from the multiple depth-aware processed signals, depth-aware enhanced imaging data, and providing the depth-aware enhanced imaging data for display on a display device.

Other implementations of this aspect include corresponding systems, apparatus, and computer programs, configured to perform the actions of the methods, encoded on computer storage devices.

These and other implementations can each optionally include one or more of the following features. In some implementations, the methods further include generating, from the imaging data, the depth map of the imaging data, and determining, using the depth map, the multiple depth values.

In some implementations, obtaining imaging data includes obtaining, from a camera of a user device, video data including multiple frames.

In some implementations, the methods further include obtaining, coordinate data defining positions of one or more of i) a body ii) a head iii) a face and iv) eye(s) of a dominant viewer of a display of a user device by a camera. Generating, from the multiple depth-aware processed signals, depth-aware enhanced imaging data can further include generating, based on the coordinate data, a spatial modulation of the depth-aware enhanced imaging data, where the spatial modulation of the depth-aware enhanced imaging data specifies modification of one or more of shadow, shading, and halo of the depth-aware enhanced imaging data.

In some implementations, obtaining the scene lighting mode vector includes generating, from the imaging data and depth values from the depth map of the imaging data, the scene lighting mode vector.

In some implementations, the methods further include converting pixel values of the imaging data to a perceptual color space prior to generating the multiple signals, and converting pixel values of the depth-aware enhanced imaging data to a display color space prior to providing the depth-aware enhanced imaging data for display.

In some implementations, generating the multiple depth-aware processed signals including the depth-aware enhanced edge emphasis signals and depth-aware enhanced detail signals includes applying, to the multiple edge emphasis signals and utilizing emphasis gain values obtained from the scene lighting mode vector, a nonlinear emphasis amplitude modulation to generate the depth-aware enhanced edge emphasis signals, and applying, to the multiple detail signals and utilizing detail gain values obtained from the scene lighting mode vector, a nonlinear detail amplitude modulation to generate the depth-aware enhanced detail signals.

The present disclosure also provides a non-transitory computer-readable media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a non-transitory computer-readable media device coupled to the one or more processors having instructions stored thereon which, when executed by the one or more processors, cause the one or more processors to perform operations in accordance with implementations of the methods provided herein.

Particular embodiments of the subject matter described in this specification can be implemented to realize one or more of the following advantages. An advantage of this technology is that details contained in videos under various scene lighting conditions (e.g., high dynamic range, hazy/foggy, unevenly/poorly lit) can be enhanced with improved detail retention, e.g., by enhancing details in under/overexposed scenes while avoiding or reducing the loss of details within the scene. Enhancement of imaging data can improve both user viewing experience in static and interactive displays and detection, recognition, identification, etc., of objects and scenes in the enhanced imaging data (e.g., improve efficacy and accuracy of facial recognition software). Utilizing depth map information in combination with scene lighting mode awareness can result in improved viewer experience for two-dimensional (2D) single- or multi-view displays by enhancing three-dimensional (3D) depth perception and supporting motion interaction of the displayed scenes based on viewer position relative to a display. Depth-aware enhancement modulation engine can be configured to support multiplexed output video frames and supports backward compatibility for stereo/multi-view displays for viewers with or without wearing active or passive stereoscopic eyeglasses. Additionally, processes described herein may be suitable for 1-to-1, 1-to-N, and N-to-N video conferencing, where motion interaction support benefits from low network latency.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Overview

Figure 1:
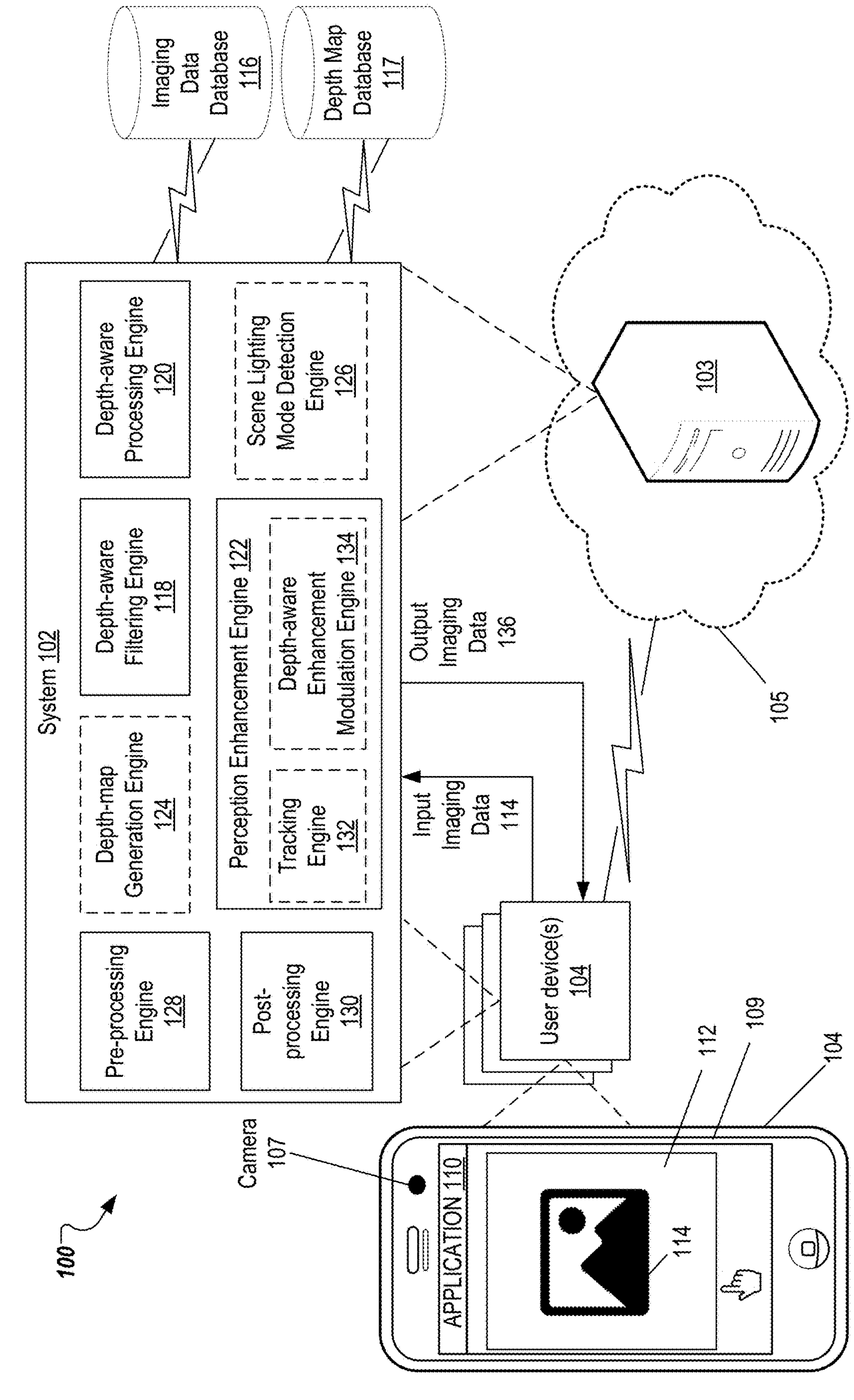
FIG. 1 depicts an example operating environment of an imaging data enhancement system.

Implementations of the present disclosure are generally directed to enhancement of video/image data. More particularly, implementations of the present disclosure are directed to utilizing depth map information in combination with depth-aware filtering, processing, and enhancement modulation to generate enhanced video/images presented on two-dimensional (2D) single- or multi-view displays.

In computational photography, images are often decomposed into a piecewise smooth base layer and one or more detail layers. The base layer captures the larger scale variations in intensity, and is typically computed by applying an edge-preserving smoothing operator to the image, such as bilateral filtering, joint three-dimensional (3D) spatial-depth-value filtering, or weighted least squares (WLS) operator.

The multiscale detail layers can then be defined as the differences between the original image and the intermediate base layer in a successive image coarsening process. In order to produce multiscale base-detail decompositions, the edge-preserving smoothing operator allows for increasingly larger image features to migrate from the intermediate base layer to the corresponding detail layer.

A typical image comprised of a scene with various natural and artificial objects usually can be decomposed into a base layer and a plurality of multiscale detail layers. Namely, a relatively smooth base signal while preserving salient edges in the image, together with a plurality of multiscale detail signals each capturing the finer details, features, and textures in the image in successfully smaller spatial scales. After applying the multiscale base-detail decompositions to such an image, each of the resultant layers (i.e., signals) may be manipulated separately in various ways, depending on the application, and possibly recombined to yield the final result in order to achieve e.g., dynamic range compression/expansion, multi-scale tone manipulation, multi-scale detail enhancement/suppression, etc.

The decomposed base signal can be considered as representing the illuminance of the scenes, while the multiscale detail signals can be considered as capturing the details and textures of the surface reflectance in multiple spatial scales. Therefore, multiscale details, textures, and features control can be achieved by manipulating extracted multiscale detail signals.

Similarly, the depth map associated with a typical image comprised of a scene with objects in different depths, a plurality of multiscale edge emphasis signals can be extracted from the depth map, which in turn can be considered as capturing the depth textures (e.g., surface gradients of objects) and depth edges (e.g., boundaries between foreground objects and background) in multiple spatial scales. Therefore, multiscale shadings and shadows control can be achieved by manipulating extracted multiscale emphasis signals. Each of the edge emphasis signals may be manipulated separately in various ways, depending on the application, and possibly recombined to yield the final result in order to support e.g., selective shading and shadow enhancement, halo and countershading manipulation, depth darkening, depth brightening, etc.

As described in further detail below, implementations of the present disclosure obtain depth values from the depth map information. Base and detail signals are obtained from the imaging data and depth maps corresponding to each image of the imaging data using a joint three-dimensional (3D) spatial-depth-value filtering process. Edge emphasis signals are obtained from depth maps corresponding to each image of the imaging data using a depth edge filtering process. The detail signals (Detail) and edge emphasis signals (Emphasis) are separately modulated utilizing a depth-aware process based on a detected scene lighting mode (or an estimated scene lighting mode) for the imaging data and the depth values, to generate depth-aware enhanced detail signals (Detail') and depth-aware enhanced edge emphasis signals (Emphasis'). The base signal (Base) is converted to a depth-aware converted base signal (Base') utilizing a depth-aware conversion based on the detected scene lighting mode (or estimated scene lighting mode) that refers to a category of scene lighting determined for the imaging data based, e.g., in part on the brightness, contrast, and shadow distributions with respect to depth of the scene for the imaging data and the depth values (e.g., using a 2D parametric mapping or a 2D look-up table interpolation). The enhanced detail and edge emphasis signals (Detail' and Emphasis') and the converted base signal (Base') are combined to generate a depth-aware enhanced imaging data, e.g., depth-aware enhanced video data and can be spatially modulated, for example, based on a depth-aware positioning of a viewer of the imaging data, e.g., by tracking a body/head/face/eye position of the viewer in real-time.

In general, for many devices or systems for capturing, processing, and displaying imaging data, overexposure or underexposure can be problematic for high dynamic range (HDR) scenes. Overexposure can occur in near objects (i.e., objects close to the front of the scene) for typical front-lighted HDR scenes, for example, in night scenes where nearby objects of interest such as humans or vehicles (or other objects that may be of particular interest to a user viewing the scene) are illuminated by strong floodlights or infrared (IR) illuminators frontally, making them overexposed and losing details that may be relevant for detection, recognition, identification, etc., for example, facial features, license plates of vehicles, fine details or textures of objects, defined edges/shapes/curves, etc. Underexposure can occur for near objects for typical back-lighted HDR scenes, for example, in indoor or night scenes where nearby significant objects such as humans or vehicles are illuminated by strong lights or windows from behind, making them underexposed and losing crucial details for detection, recognition, identification, etc.

Typical scene lighting modes can be detected and exploited by the depth-aware processes described herein. In some implementations, scene lighting mode can be learned (e.g., using linear or kernel support vector machine (SVM), fully connected neural networks (FCNN), or other machine learning (ML) algorithms) and detected by brightness, contrast, and shadow distributions with respect to depth and can be detected and assigned globally for the whole scene or locally for mixed modes within a scene. Scene light mode detection can be utilized to identify and correct for various lighting modes, for example, (1) front-lighted scenes where nearby objects of interest are illuminated by strong lights frontally with weak contrast, (2) back-lighted scenes where nearby objects of interest are illuminated by strong lights from behind with weak contrast, (3) air-lighted scenes where most objects of interest are illuminated with good contrast and strong shadows, (4) diffusely lighted scene where most objects of interest are well illuminated with good contrast without strong shadow, (5) hazy scenes where most objects of interest are well illuminated with depth-decreasing contrast without strong shadow, and (6) scenes including specular objects which are self-emitting or reflecting strong lights which can be easily detected and treated separately.

In general, as described with reference to FIGS. 2-5 below, depth-aware video processing and depth perception enhancement can be utilized to enhance the video/image data. A depth map generator may use a variety of existing algorithms to generate depth map at desired complexity and accuracy. As described in further detail below, depth-aware filtering decomposes the input video signal into base and detail signals and obtains edge emphasis signals. Depth-aware processing can enhance base, detail and emphasis signals according to depth and scene lighting mode.

In some implementations, as discussed with reference to FIG. 2 below, depth-aware video processing includes multiscale base-detail decomposition. Many natural objects and many artificial objects exhibit multiscale details, textures, features, and shadings, such that joint 3D spatial-depth-value filtering can be applied successively with increasingly coarser scales and higher amplitudes for edge-preserving multiscale base-detail decomposition to generate a base signal and multiscale detail signals. A typical image comprised of a scene with various natural and artificial objects usually can be decomposed into a base signal and a plurality of multiscale detail signals. Namely, a relatively smooth base signal while preserving salient edges in the image, together with a plurality of multiscale detail signals each capturing the coarser details, features, and textures in the image in successfully larger spatial scales.

In some implementations, depth-aware video processing includes depth edge filtering that is applied individually with increasingly coarser scales and higher amplitudes to depth maps corresponding to each image of the imaging data for multiscale edge emphasis extraction to generate multiscale emphasis signals. In other words, multiple multiscale edge emphasis signals can be obtained from the depth textures (e.g., surface gradients of objects) and depth edges (e.g., boundaries between foreground objects and background). Depth-aware processing with depth-aware enhancement modulation and depth-aware base contrast conversion can support multiscale detail and emphasis signals and a base signal for detail enhancement, dynamic range compression, and depth perception enhancement.

In some implementations, depth-perception enhancement includes tracking body/head/face/eye coordinates across frames of captured video to spatially modulate depth-aware enhanced detail and depth-aware enhanced emphasis signals according to the depth signal to generate an enhancement signal to be added to a depth-aware converted base signal. In some implementations, scene lighting mode detection can be utilized to detect a scene lighting mode by brightness, contrast, and shadow distributions with respect to depth and can be detected and assigned globally for the whole scene or locally for mixed scene lighting modes within a scene, i.e., where an image/frame can include multiple sub-scenes, where each sub-scene can have respective different scene lighting mode.

Applications of this system can include, for example, detail-preserving dynamic range compression and dehazing for HDR scenes, depth-perception enhancement for static 2D static single- or multi-view displays, real-time enhancement of viewer experience at a 2D single- or multi-view interactive displays, and real-time enhancement of video conferencing to include enhanced depth perception and motion interaction (e.g., 1-to-1, 1-to-N, or N-N video conferencing).

In some implementations, an artificial intelligence (AI)-enabled processor chip can be enabled with depth-aware video processing and integrated with a processor, e.g., a central processing unit (CPU) or a graphics processing unit (GPU), in a "smart" mobile device. The AI-enabled processor chip enabled with depth-aware video processing can be utilized to receive input video frames from a video source and generate, with the depth maps for the video frames of the video, depth-aware enhanced video frames to a display. The AI-chip can be used to accelerate scene lighting mode detection and body/head/face/eye tracking using pre-trained machine-learned models stored locally on the user device and/or on a cloud-based server. Further details are described and summarized below with reference to FIGS. 1-5.

Example Operating Environment

FIG. 1 depicts an example operating environment 100 of an imaging data enhancement system 102. In general, system 102 can be configured to receive, as input, imaging data 114 and provide, as output, depth-aware enhanced output imaging data 136.

System 102 can be hosted on a local device, e.g., user device 104, one or more local servers, a cloud-based service, or a combination thereof. In some implementations, a portion or all of the processes described herein can be hosted on a cloud-based server 103.

System 102 can be in data communication with a network 105, where the network 105 can be configured to enable exchange of electronic communication between devices connected to the network 105. In some implementations, system 102 is hosted on a cloud-based server 103 where user device 104 can communicate with the imaging data enhancement system 102 via the network 105.

The network 105 may include, for example, one or more of the Internet, Wide Area Networks (WANs), Local Area Networks (LANs), analog or digital wired and wireless telephone networks e.g., Integrated Services Digital Network (ISDN), a cellular network, and Digital Subscriber Line (DSL), radio, television, cable, satellite, or any other delivery or tunneling mechanism for carrying data. The network may include multiple networks or subnetworks, each of which may include, for example, a wired or wireless data pathway. The network may include a circuit-switched network, a packet-switched data network, or any other network able to carry electronic communications e.g., data or video communications. For example, the network may include networks based on the Internet protocol (IP), asynchronous transfer mode (ATM), packet-switched networks based on IP, or Frame Relay, or other comparable technologies and may support video using, for example, motion JPEG, MPEG, H.264, H.265, or other comparable protocols used for video communications. The network may include one or more networks that include wireless data channels and wireless video channels. The network may be a wireless network, a broadband network, or a combination of networks including a wireless network and a broadband network. In some implementations, the network 105 can be accessed over a wired and/or a wireless communications link. For example, mobile computing devices, such as smartphones, can utilize a cellular network to access the network 105.

User device 104 can host and display an application 110 including an application environment. For example, a user device 104 is a mobile device that hosts one or more native applications, e.g., application 110, that includes an application interface 112, e.g., a graphical user interface, through which a user may interact with the imaging data enhancement system 102. User device 104 include any appropriate type of computing device such as a desktop computer, a laptop computer, a handheld computer, a tablet computer, a personal digital assistant (PDA), a television, a network appliance, a camera, a smart phone, a mobile phone, a videophone, a video intercom system, a media player, a navigation device, a smart watch, an email device, a game console, a medical device, a fitness devices, or an appropriate combination of any two or more of these devices or other data processing devices. In addition to performing functions related to the imaging data enhancement system 102, the user device 104 may also perform other related or unrelated functions, such as placing personal telephone calls, playing music, capturing, streaming, and playing video, capturing and displaying pictures, browsing the Internet, maintaining an electronic calendar, etc.

In some implementations, system 102 includes a video processor and a two-dimensional (2D) single-view display, e.g., a display that is included in a device 104 for video processing and display. For example, user device 104 can include one or more cameras 107, e.g., a front-facing camera, a rear-facing camera, or both, configured to capture imaging data within a field of view of the camera 107. User device 104 includes a video processor (e.g., a dedicated video processor or a CPU configured to provide video processing), a dedicated hardware, or a combination thereof. User device 104 can include a display 109, e.g., a touchscreen, monitor, projector, or the like, through which a user of the user device 104 may view and interact with an application 110 via an application environment 112.

In some implementations, user device 104 can include an integrated camera as a component of the user device, e.g., a front-facing camera of a mobile phone or tablet (as depicted in FIG. 1). In some implementations, user device 104 can be in data communication with an external (peripheral) camera, e.g., a web-camera in data communication with a computer. Application 110 running on the user device 104 can be in data communication with the camera 107 and can have access to the imaging data 114 captured by the camera 107 or received over the network 105.

Application 110 refers to a software/firmware program, a dedicated or programmable hardware, or a combination thereof, running or operating on the corresponding user device that enables the user interface and features described throughout, and enables communication on user device 104 between the user and the imaging data enhancement system 102. The user device 104 may load, install, and/or integrated with the application 110 based on data received over a network or data received from local media. The application 110 runs or operates on user device platforms. The user device 104 may receive the data from the imaging data enhancement system 102 through the network 105 and/or the user device 104 may host a portion or all of the imaging data enhancement system 102 on the user device 104.

In some implementations, system 102 can obtain, as input, imaging data 114 (e.g., video data and/or image data) from an imaging data database 116 including a repository of imaging data 114. Imaging data database 116 can be locally stored on user device 104 and/or stored on cloud-based server 103, where the imaging data enhancement system 102 may access imaging data database 116 via network 105. Imaging data database 116 can include, for example, a user's collection of videos and/or photographs captured using camera 107 on a mobile phone. As another example, imaging database 116 can include a collection of videos and/or photographs captured by multiple user devices and stored in a remote location, e.g., a cloud server. In another example, imaging database 116 can include videos and/or photographs for video broadcast, video multicast, video streaming, video-on-demand, celebrity online live video shows, and other similar applications with live or pre-recorded imaging data.

In some implementations, system 102 can obtain, as input, imaging data 114 captured in real-time (or on a time-delay) by a camera 107 of a first user device 104, e.g., streaming video data captured by camera 107 of a user device 104 and where the imaging data enhancement system 102 provides, as output, enhanced imaging data 136 to a display 109 of a second user device 104. In one example, system 102 receives streaming video data captured by a front-facing camera of a mobile phone or computer, where a user of the user device is engaged in a video conference call with one or more other users on one or more other user devices 104 each optionally including a respective camera 107. Further details of embodiments including video conferencing are described below.

System 102 can include one or more engines to perform the actions described herein. As described herein, the one or more engines can be implemented as software or programmatic components defined by a set of programming instructions that when executed by a processor perform the operations specified by the instructions. The one or more engines can also be implemented as dedicated or programmable hardware, or a combination of software, firmware, and hardware. In some implementations, the imaging data enhancement system 102 includes a depth-aware filtering engine 118, a depth-aware processing engine 120, and a perception enhancement engine 122. Optionally, the imaging data enhancement system 102 can include a depth map generation engine 124, a scene lighting mode detection engine 126, a pre-processing engine 128, and a post-processing engine 130. Though described herein as a depth-aware filtering engine 118, a depth-aware processing engine 120, and a perception enhancement engine 122, the processes described can be performed by more or fewer engines or components. Some or all of the processes described herein can be performed on either edge side (e.g., a user device 104), or cloud side (e.g., a cloud-base server 103), or shared by both sides, depending on the computational capability, data transmission bandwidth, and network latency constraints.

The operations of each of the depth-aware filtering engine 118, depth-aware processing engine 120, and perception enhancement engine 122 are each described with reference to FIG. 1 briefly, and in further detail with respect to FIGS. 2-5 below.

Depth-aware filtering engine 118 is configured to receive, as input, imaging data 114 and respective depth map(s) for the imaging data 114, and i) decompose base and detail signals from the imaging data and depth map(s) (e.g., for each input video frame and respective depth map) using joint 3D spatial-depth-value filtering and ii) obtain edge emphasis signals using depth edge filtering from the depth map(s). The depth-aware filtering engine 118 is configured to provide, as output, the base signal, detail signals, and edge emphasis signals.

Depth-aware processing engine 120 is configured to receive, as input, base, detail, and edge emphasis signals from the depth-aware filtering engine 118 as well as the depth map(s) corresponding to the imaging data 114, and generate, as output, enhanced edge emphasis signals (Emphasis') and detail signals (Detail') and a converted base signal (Base') according to an estimated or detected scene lighting mode (e.g., a scene lighting mode detected by a scene lighting mode detection engine 126).

In some implementations, the imaging data enhancement system 102 can enhance imaging data viewed by a viewer by spatially modulating the imaging data based on a location of the viewer with respect to a display presenting a video. For example, the imaging data enhancement system 102 can enhance video data of a first scene captured by a first camera of a first user device (e.g., for a first dominant viewer) for presentation to a second dominant viewer on a second device based on a location (e.g., 2D coordinates) of the second dominant viewer relative to the display of the second device. The location of the second dominant viewer can be determined based on imaging data captured in a second scene including the coordinates/position data captured of the second dominant viewer by a second camera of the second user device. In such implementations, the second camera of the second device that collects the coordinates of the second dominant viewer, is different than the first camera for the first device that is used to collect imaging data of the first scene (e.g., of the first dominant viewer using the first device) which is then processed by the imaging data enhancement system 102 and provided to the second dominant viewer as enhanced video data via the second display. As used within, a dominant viewer is a user who is nearest to the screen or largest in shape and that may be tracked by the system 102. Further details are described with reference to FIG. 5B below.

Perception enhancement engine 122 can include a tracking engine 132 and a depth-aware enhancement modulation engine 134. Tracking engine 132 is configured to track 2D coordinates of a dominant viewer's body/head/face/eyes for each output video frames from the optional front-facing 2D camera on each device, e.g., the second dominant viewer as described in the example above. The coordinates of the dominant viewer can be collected using a camera (e.g., front-facing camera) of a user device of the dominant viewer, e.g., using the second camera of the second user device as described in the example above.

The tracking engine 132 may utilize various existing algorithms known to those of ordinary skill in the art with different levels of tracking accuracy and computation complexity, e.g., shape-motion based object tracking (with lower complexity and accuracy), local feature based object detecting and tracking (with higher accuracy and complexity), deep learning based object detecting and tracking (with even higher accuracy and complexity), or a combination thereof.

Depth-aware enhancement modulation engine 134 is configured to receive, as input, Emphasis' signals, Detail' signals, Base' signal, and depth map(s) for the imaging data 114 from the depth-aware processing engine 120 and generate, as output, spatially modulated enhancement signals within the imaging data 114 (e.g., within the video frames) to be displayed on a screen (e.g., display 109 of user device 104) to achieve spatial modulation of the displayed video (i.e., motion-aware presentation) relative to a position of the dominant viewer to the display 109, for example, according to the dominant viewer's head motion and/or eye gaze. In other words, the perception enhancement engine 122 uses tracked body/head/face/eye coordinates to spatially modulate the Detail' and Emphasis' signals according to the depth signal to generate an enhancement signal to be added to Base' signal.

In some implementations, depth-aware enhancement modulation engine 134 is configured to support multiplexed output video frames and supports backward compatibility for stereo/multi-view displays for viewers with or without wearing active or passive stereoscopic eyeglasses.

In some implementations, system 102 further includes a scene lighting mode detection engine 126. Scene lighting mode detection can be optimized or trained by machine learning (ML) algorithms. For example, linear or kernel support vector machine (SVM), fully connected neural networks (FCNN), or other ML algorithms can be used for Scene lighting mode detection. In an example, scene lighting mode can be learned by mean brightness, mean relative contrast, shadow pixel counts, and specular pixel counts with respect to depth histogram for each depth bin by supervised training with scene-mode data pairs. Scene lighting mode can be detected and assigned globally for each scene or locally for mixed modes within a scene, depending on application/scene types, use cases, system function setting, viewer requirements, or a combination thereof. The pre-defined scene lighting modes for the scene-mode data pairs can include, for example, front-lighted mode, back-lighted mode, air-lighted mode, diffusely lighted mode, hazy/foggy mode, and/or other user-defined modes.

In some implementations, system 102 includes a depth map generation engine 124 that is configured to receive imaging data 114 and associated metadata and generate a depth map corresponding to the imaging data, e.g., each input video frame of a video, that is transmitted to the user device. Depth map generation engine may use a variety of algorithms to generate depth map at a desired complexity and accuracy.

Figure 2:
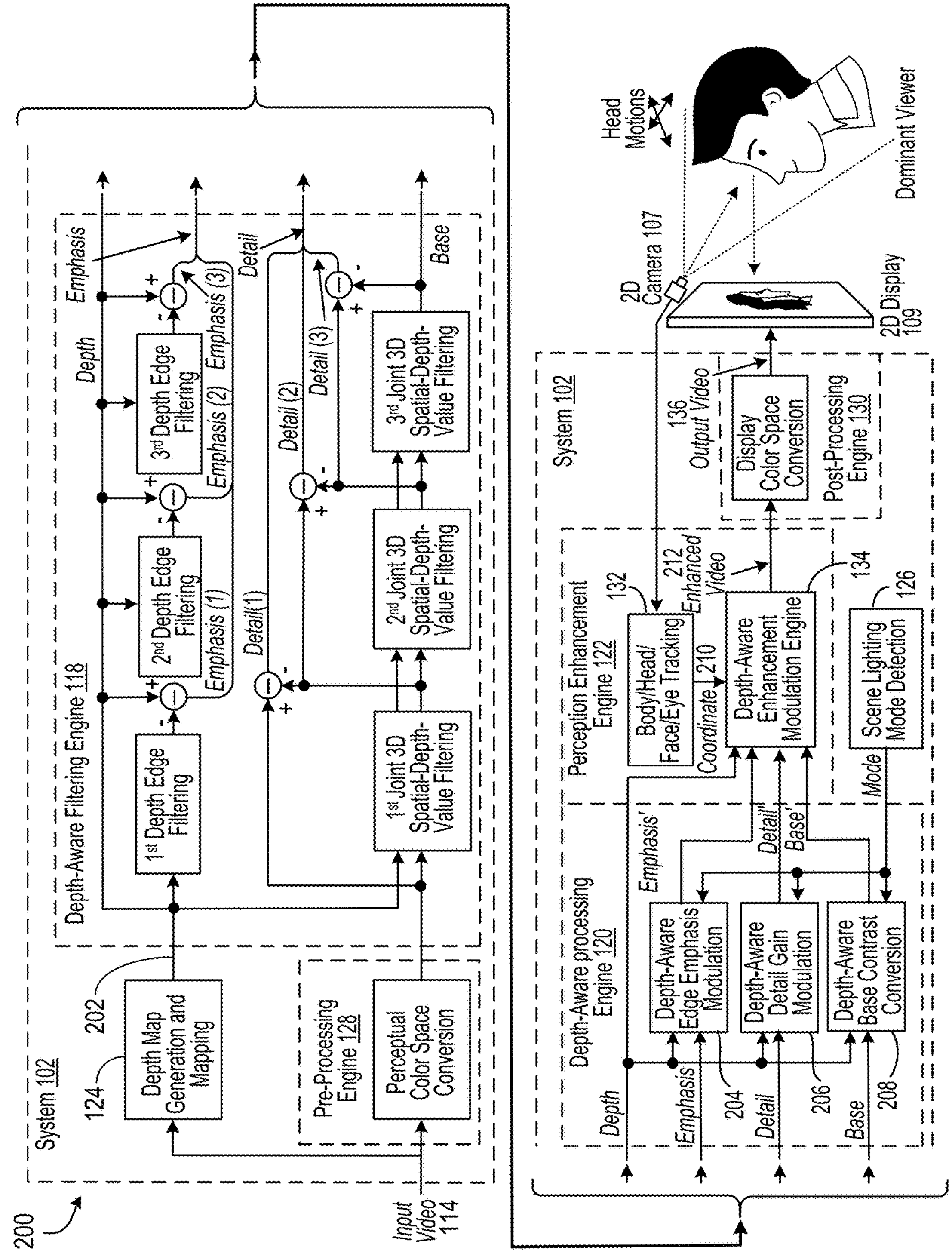
FIG. 2 depicts a block diagram of an example architecture of the imaging data enhancement system.

The depth map generation engine 124 is configured to receive imaging data 114 and associated metadata as input, and output the depth map information with depth values (202 as shown in FIG. 2) corresponding to each pixel on the input video frame of a video, that is transmitted to the user device. The depth map generation engine 124 may utilize various existing algorithms with different levels of depth map accuracy and computation complexity, e.g., foreground/background segmentation for layered depth map values, i.e., foreground objects versus background surrounding (with lower complexity and accuracy), monocular depth estimation for ordinal depth map values (with higher accuracy and complexity), monocular depth sensing for metric depth map values (with even higher accuracy and complexity), or a combination thereof.

Monocular depth estimation methods can be based on depth cues for depth prediction with strict requirements, e.g., shape-from-focus/defocus methods require low depth of field on the scenes and images. Other depth estimation methods, like structure from motion and stereo vision matching, are built on feature correspondences of multiple viewpoints, and the predicted depth maps are sparse. Deep learning-based monocular depth estimation mostly rely on deep neural networks (DNNs), where dense depth maps are estimated from single images by deep neural networks in an end-to-end manner. In order to improve the accuracy of depth estimation, different kinds of network frameworks, loss functions and training strategies can be utilized. Existing monocular depth estimation methods based on deep learning utilize different training methods, e.g., supervised, unsupervised, and semi-supervised.

Many deep learning-based monocular depth estimation methods can take advantage of the semantic (i.e., context) information of the scene, taking into account the characteristics of the scene from far to near, overcoming problems such as object boundaries blur, and improving the accuracy of the estimated depth maps with higher complexity. Monocular depth sensing which apply data fusion algorithms to combine depth estimates from deep learning-based monocular depth estimation and other dense or sparse depth cues (e.g., defocus blur, chromatic aberration, phase-detection pixels, color-coded aperture, uneven double refraction, etc.) may provide more accurate metric (i.e., absolute) depth values with even higher complexity.

In some implementations, depth map data 202 may be generated outside of the imaging data enhancement system 102 using processes similar to those of depth map generation engine 124 for monocular depth generation/estimation. Alternatively, there may be dedicated depth sensing hardware devices that can measure the depth map values directly from the scene instead of generating/estimating the depth map 202 indirectly from the associated input imaging data 114. The depth map data 202 pre-generated outside of the imaging data enhancement system 102 for the input imaging data 114 can also be stored in a depth map database 117 which is a repository of depth the pre-generated maps. The depth map sensing/measurement outside of the imaging data enhancement system 102 may utilize various existing depth sensing techniques known to those of ordinary skill in the art with different levels of depth map accuracy, measurement range, and hardware/computation complexity, e.g., stereoscopic cameras, array cameras, light-field (i.e., plenoptic) cameras, time-of-flight (ToF) cameras, light detecting and ranging (LiDAR) systems, structured light systems, or a combination thereof.

A depth map post-processing step may be desired inside the depth map generation engine 124, where the depth values on object boundaries of a generated/estimated depth map is processed to generate a new depth map such that the object boundaries will be aligned on the new depth map, and then the output video quality of the subsequent processing blocks can be substantially improved. An adjustment in the depth values of edge pixels from a depth map before the subsequent processing blocks can be performed. Such techniques can significantly reduce visual artifacts presented in the enhanced video signal 212, such as jaggy edges, rims and dots along sharp edges, etc.

In some implementations, the imaging data enhancement system 102 can receive a pre-generated depth map(s) corresponding to the imaging data 114 from external sources, e.g., from an imaging data database 116 including a repository of the imaging data 114. Depth map database 117 can be a repository of depth maps pre-generated by the depth map generation engine 124 for input imaging data 114 and/or depth map(s) received by the system associated with imaging data 114 (e.g., pre-generated depth map(s)).

In some implementations, the imaging data enhancement system 102 includes a pre-processing engine 128 and/or a post-processing engine 130. Pre-processing engine can be configured to perform a perceptual color space conversion on the input imaging data 114 received by the system 102 and prior to the input imaging data 114 being input to the depth-aware filtering engine 118. Post-processing engine 130 can be configured to perform a display color space conversion on the enhanced imaging data output by the perception enhancement engine 122 and prior to the output imaging data 136 being output by the imaging data enhancement system 102. In some implementations, one or more of the operations of the pre-processing engine 128 and/or post-processing engine 130 can be performed by components of user device 104 or another system rather than by the imaging data enhancement system 102, i.e., in cases where system 102 is implemented in whole or in part on the user device 104.

FIG. 2 depicts a block diagram 200 of an example architecture of the imaging data enhancement system 102. Depth-aware processing and depth-aware enhancement modulation described herein can be applied to generate multiscale detail and emphasis signals, e.g., at different refinement scales, for detail enhancement, dynamic range compression, and depth perception enhancement. Though the depth-aware filtering engine 118 depicted with respect to FIG. 2 (as an example of multiscale base-detail decomposition architecture) includes three depth edge filtering processes and three joint 3D spatial-depth-value filtering processes, it can be understood to be applicable to more or fewer number of processes, e.g., one depth edge filtering process and one joint 3D spatial-depth-value filtering process, e.g., five depth edge filtering processes and five joint 3D spatial-depth-value filtering processes, etc.

Many natural objects (e.g., objects/humans appearing in image/video data captured by a camera) and many artificial objects (e.g., computer-rendered objects) exhibit multiscale details, textures, features, and shadings. As depicted in FIG. 2, depth-aware filtering engine 118 of system 102 includes multiple joint 3D spatial-depth-value (SDV) filtering processes (also referred to herein as SDVF processes), e.g., $1^{st}$ joint 3D SDV filtering, $2^{nd}$ joint 3D SDV filtering, and $3^{rd}$ joint 3D SDV filtering as depicted in FIG. 2, that can be applied successively to the input imaging data 114 and corresponding depth values 202, e.g., with increasingly coarser scales and higher amplitudes, for edge-preserving multiscale base-detail decomposition and to generate a base signal and multiscale detail signals. More specifically, the depth-aware filtering engine 118 obtains imaging data 114 and depth values 202 generated by depth map generation engine 124 or obtained from depth map database 117 corresponding to the imaging data 114 (as described with reference to FIG. 1) and applies one or a plurality of successive joint 3D spatial-depth-value (SDV) filtering processes to each pixel of the imaging data 114:

$$SDVF_p = \frac{1}{W_p}\sum\nolimits_q G_s(q-p)G_d(D_q-D_p)G_v(I_q-I_p)I_q \tag{1}$$

$$W_p = \sum\nolimits_q G_s(q-p)G_d(D_q-D_p)G_v(I_q-I_p) \tag{2}$$

where $SDVF_p$ is the output pixel value for the joint 3D spatial-depth-value (SDV) filtering at pixel index p, $G_s$ is a spatial kernel, $G_d$ is a depth kernel, $G_v$ is a value kernel, $W_p$ is a normalization factor at pixel index p. The two pixel indexes q and p are used for identifying pixels located on the 2D input image with the corresponding depth values $D_q$ and $D_p$ and pixel values $I_q$ and $I_p$, respectively.

The spatial kernel $G_s$ is used to provide weighting for the summation according to spatial closeness, i.e., the smaller the pixel index distance (q−p) between pixel q and p, the larger the $G_s(q-p)$ value. The depth kernel $G_d$ is used to provide weighting for the summation according to depth closeness, i.e., the smaller the pixel depth difference ($D_q-D_p$) between pixel q and p, the larger the $G_d(D_q-D_p)$ value. The value kernel $G_v$ is used to provide weighting for the summation according to value similarity, i.e., the smaller the pixel value difference ($I_q-I_p$) between pixel q and p, the larger the $G_v(I_q-I_p)$ value. If the pixel values $I_q$ and $I_p$ are multi-dimensional, such as the 3-dimensional pixel values in a RGB color space, the pixel value difference ($I_q-I_p$) can be defined to be the Euclidean distance between the pixel values $I_q$ and $I_p$ in the multi-dimensional color space. Generally, $G_s$, $G_d$, $G_v$ can be assigned to Gaussian kernels of variance $$\sigma_s^2,\ \sigma_d^2,\ \text{and}\ \sigma_v^2,$$

respectively, defined by $$G_s(x) = e^{\left(-x^2/2\sigma_s^2\right)},\ G_d(x) = e^{\left(-x^2/2\sigma_d^2\right)},$$

and $$G_v(x) = e^{\left(-x^2/2\sigma_v^2\right)},$$

respectively, where $\sigma_s$, $\sigma_d$, and $\sigma_v$ are the respective kernel parameters, i.e., the standard deviation of each Gaussian kernel.

Formally, the summation $\Sigma_d$ in equation (1) and (2) covers the entire input image but in practice may be limited to local windows of radius $3\sigma_s$ since the Gaussian spatial kernel $G_s$ becomes almost zero for any distant pixel q with pixel index distance (q−p) between pixel q and p larger than $3\sigma_s$.

Because the products of the spatial kernel, depth kernel, and value kernel are data-dependent and therefore may not be pre-calculated before the imaging data input is available, the total weight applied in the summation of equation (1) is also data-dependent and may not be pre-calculated and normalized before the imaging data input is available. In order to ensure that the weights for all the pixels add up to one for each output pixel value $SDVF_p$, a normalization factor $W_p$ can be calculated for each pixel index p by the summation, i.e., total weight around pixel index p, in equation (2) and the resulting normalization factor $W_p$, i.e., total weight, can be applied in equation (1) to normalize the summation, i.e., weighted sum of pixel values around pixel index p. After the normalization by dividing the summation in equation (1) by the normalization factor $W_p$ from equation (2), the output value $SDVF_p$ becomes the weighted average of pixel values around pixel index p.

Each of the one or a plurality of successive joint 3D spatial-depth-value (SDV) filtering processes, i.e., equations (1) and (2), can be applied successively to the input imaging data 114 and corresponding depth map values 202 for edge-preserving multiscale base-detail decomposition to generate a base signal and multiscale detail signals, e.g., a Base signal and Detail(1), Detail(2), and Detail(3) signals. Each of the one or a plurality of successive joint 3D spatial-depth-value (SDV) filtering processes acts as an edge-preserving smoothing operator e.g., with increasingly coarser scales and higher amplitudes by assigning increasing spatial, depth, and value kernel parameters throughout the successive filtering processes.

An example successive joint 3D spatial-depth-value (SDV) filtering process with three scales is depicted inside the depth-aware filtering engine 118 as shown in FIG. 2. The output of each of the successive joint 3D spatial-depth-value (SDV) filtering process is configured to be the input of the subsequent joint 3D spatial-depth-value (SDV) filtering process. Therefore, the output of each of the successive joint 3D spatial-depth-value (SDV) filtering process provides a successively smoothened version of the input imaging data 114 where more details, textures, and edges with smaller spatial scales and lower amplitudes are successively smoothened out. The difference between the input and the output of each of the successive joint 3D spatial-depth-value (SDV) filtering process is assigned to be the resultant detail signal of the input imaging data 114 for the corresponding spatial scale. The output of the last joint 3D spatial-depth-value (SDV) filtering process is assigned to be the resultant base signal.

The depth-aware filtering engine 118 receives depth values 202 generated by depth map generation engine 124 or obtained from depth map database 117 to perform multiple depth edge filtering processes, e.g., 1st depth edge filtering, 2nd depth edge filtering, and 3rd depth edge filtering as depicted in FIG. 2, where each depth edge filtering process is individually applied to the depth values 202 with increasingly coarser scales and higher amplitudes for multiscale edge emphasis extraction and generates a respective edge emphasis signal, e.g., Emphasis(1), Emphasis(2), and Emphasis(3) signals.

Depth-aware processing engine 120 receives the depth values 202, the one or more emphasis signals, e.g., three input emphasis signals as depicted in FIG. 2, the one or more detail signals, e.g., three input detail signals as depicted in FIG. 2, and the base signal as input. Depth-aware processing engine 120 performs depth-aware edge emphasis modulation 204, depth-aware detail gain modulation 206, and depth-aware base contrast conversion 208 processes on the input signals to generate Emphasis', Detail', and Base' signals as output. Further details of the processes of the depth-aware processing engine 120 are described below with reference to FIG. 3.

Perception enhancement engine 122 receives the depth values 202, and Emphasis', Detail', and Base' signals as input. In some implementations, perception enhancement engine 122 includes a body/head/face/eye tracking engine 132 which collects body/head/face/eye coordinate data 210, 120 e.g., from camera 107 of a dominant viewer of a user device 104. The depth-aware enhancement modulation engine 134 of perception enhancement engine 122 can receive the coordinate data 210 and the Emphasis', Detail', and Base' signals and the depth values 202 as input and generate enhanced video 212 as output. Further details of the processes of the perception enhancement engine 122 are described below with reference to FIGS. 5A and 5B.

Enhanced video 212 can be processed by post-processing engine 130, including a display color space conversion process (as described with reference to FIG. 1), to generate output imaging data 136, e.g., output video. The output imaging data 136 may be provided for presentation on a display 109 of a user device 104. For example, the output imaging data 136 can be video data presented to one or more viewers participating in a video-based conference call.

Figure 3:
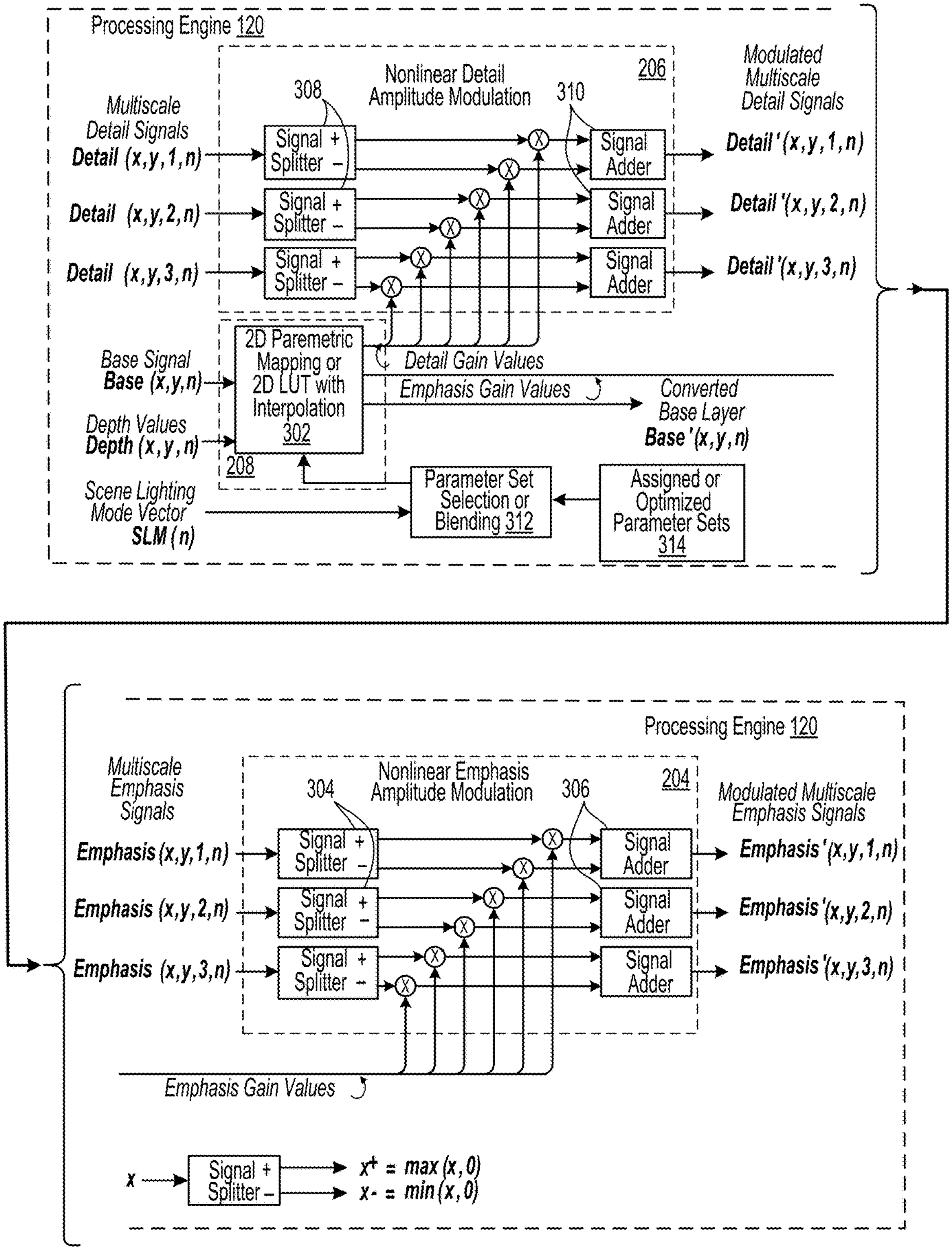
FIG. 3 depicts a block diagram of an example architecture of the depth-aware processing engine of the imaging data enhancement system.

FIG. 3 depicts a block diagram of an example architecture of the depth-aware processing engine 120 of the imaging data enhancement system 102. As configured (and as described with reference to FIG. 2), the depth-aware processing engine 120 of the imaging data enhancement system 102 can be utilized for performing depth-aware edge emphasis modulation 204, depth-aware detail gain modulation 206, and depth-aware base contrast conversion 208. As depicted in FIG. 3, positive and negative swings of emphasis and detail signals are treated separately for example, to support selective shading and shadow enhancement, halo and counter-shading manipulation, depth darkening, depth brightening, etc.

Depth-aware edge emphasis modulation 204, as depicted in FIG. 3 with an example architecture, receives input emphasis signal(s), e.g., Emphasis(1), Emphasis(2), and Emphasis(3), where Emphasis(s), s=1, 2, and 3, is an abbreviated representation of Emphasis(x, y, s, n) where x and y are the spatial index in 2D coordinates, s is the multiscale index, and n is the temporal index in frame number, and generates modulated emphasis signal(s), e.g., Emphasis'(1), Emphasis'(2), and Emphasis'(3), as output. In some implementations, the depth-aware edge emphasis modulation 204 receives input emphasis signal(s) and passes each emphasis signal through a respective signal splitter 304 to generate positive and negative swings. The positive and negative swings of each emphasis signal are then modulated in a nonlinear emphasis amplitude modulation process with emphasis gain values obtained from the 2D parametric mapping or 2D lookup table (LUT) with interpolation process 302 and then summed by a respective signal adder 306 to generate a modulated emphasis signal, e.g., Emphasis'(1), Emphasis'(2), and Emphasis'(3).

Depth-aware detail gain modulation 206, as depicted in FIG. 3 with an example architecture, receives input detail signal(s), e.g., Detail(1), Detail(2), and Detail(3) and generates modulated detail signal(s), e.g., Detail'(1), Detail'(2), and Detail'(3), as output. In some implementations, the depth-aware detail gain modulation 206 receives input detail signal(s) and passes each detail signal through a respective signal splitter 308 to generate positive and negative swings. The positive and negative swings of each detail signal are then modulated in a nonlinear detail amplitude modulation process with detail gain values obtained from the 2D parametric mapping or 2D lookup table (LUT) with interpolation process 302 and then summed by a respective signal adder 310 to generate a modulated detail signal, e.g., Detail'(1), Detail'(2), and Detail'(3).

Depth-aware base contrast conversion 208, as depicted in FIG. 3 with an example architecture, receives input base signal Base(x, y, n) and depth values 202 Depth(x, y, n) as input and generates a converted base signal Base'(x, y, n) as output, where x and y are the spatial index in 2D coordinates, and n is the temporal index in frame number. In some implementations, parameter sets for each scene lighting mode are selected or blended, as depicted in block 312 in FIG. 3, by an estimated scene lighting mode vector SLM(n). In some implementations, assigned or optimized parameter sets, as depicted in block 314 in FIG. 3, can be tuned by viewer preferences or style settings, or optimized and/or trained (using a model) to achieve best IQ (Image Quality) by HVS (human vision system) or best mAP (Mean Average Precision) for computer vision (CV) applications.

In FIG. 2, the depth-aware edge emphasis modulation 204, the depth-aware detail gain modulation 206, and depth-aware base contrast conversion 208 are depicted as three separate processing blocks inside the depth-aware processing engine 120. As depicted in FIG. 3, the three processing blocks 204, 206, 208 share the 2D parametric mapping or 2D LUT with interpolation (block 302), the parameter set selection or blending (block 312), and the assigned or optimized parameter sets (block 314). If the three processing blocks 204, 206, 208 are completely separated as shown in FIG. 2, then each of them needs its own respective parameter set storage, selection/blending, and 2D parametric mapping/LUT blocks. Such an architecture depicted in FIG. 2 will be equivalent to the example architecture depicted in FIG. 3, but the system complexity will be higher.

In FIG. 3, the 2D parametric mapping or 2D LUT with interpolation (block 302) receives the two inputs B(x, y, n) and D(x, y, n) and generate the detail gain values, the emphasis gain values, and the converted base signal B'(x, y, n) as its outputs. The parameter sets for the 2D parametric mapping or 2D LUT with interpolation (block 302) may be defined in various manners. For example, the parameter sets can directly contain all node values for all the 2D LUT's (look-up tables) to be assigned to block 302, where interpolation will be applied to generate all the output values according to the assigned node values and the inputs B(x, y, n) and D(x, y, n). In another example, the parameter sets can also be set as the control parameter values for all the parametric models to replace the 2D LUT's to be assigned to block 302, where the parametric models will be evaluated with the assigned control parameter values and the inputs B(x, y, n) and D(x, y, n) to generate all the output values. The parametric models that can be used include B-spline surface fitting, polynomial surface fitting, root polynomial surface fitting, or other surface fitting methods.

Inside the depth-aware processing engine 120 shown in FIG. 3, the assigned or optimized parameter sets (block 314) stores the parameter sets to be applied in the 2D parametric mapping or 2D LUT with interpolation (block 302) for each of the L pre-defined scene lighting modes, e.g., (1) front-lighted mode, (2) back-lighted mode, (3) air-lighted mode, (4) diffusely lighted mode, (5) hazy/foggy mode, and other user defined modes. For each scene lighting mode, the parameter sets to be applied in the 2D parametric mapping or 2D LUT with interpolation (block 302) can be subjectively tuned by user adjustment according to viewer preferences and/or style settings, or objectively optimized by maximizing pre-defined IQ (Image Quality) metrics for human vision system (HVS), e.g., noise suppression, line resolution, detail/texture visibility, edge sharpness, luma/chroma alignment, and artifacts mitigation, or pre-defined computer vision (CV) metrics for machine vision applications, e.g., top-N accuracy, mAP (Mean Average Precision), Intersection-over-Union (IoU), mean squared error (MSE), mean absolute error (MAE), etc.

The parameter set selection or blending (block 312) will select or blend from the stored parameter sets (block 314) according to the estimated Scene Lighting Mode Vector SLM(n) on a frame by frame basis, where n is the temporal index in frame number. Each component of the L-dimensional estimated Scene Lighting Mode Vector SLM(n) denotes the likelihood of each of the L pre-defined scene lighting modes. When the selection criterion is used in the parameter set selection or blending (block 312), the pre-stored parameter set corresponding to the pre-defined scene lighting mode with the maximum component value in SLM(n) will be selected from the assigned or optimized parameter sets (block 314). When the blending criterion is used in the parameter set selection or blending (block 312), all the pre-stored parameter sets corresponding to all the pre-defined scene lighting modes will be retrieved from the assigned or optimized parameter sets (block 314) and a blended parameter set can be calculated by a weighted average of all the pre-stored parameter sets according to the components of the L-dimensional estimated Scene Lighting Mode Vector SLM(n). The parameter set selection or blending (block 312) can also use a combination of the selection and blending criterions, e.g., calculating by a weighted average of K pre-stored parameter sets corresponding to the pre-defined scene lighting modes with the largest K component values in SLM(n), where $1 \le K \le L$.

Figure 4A:
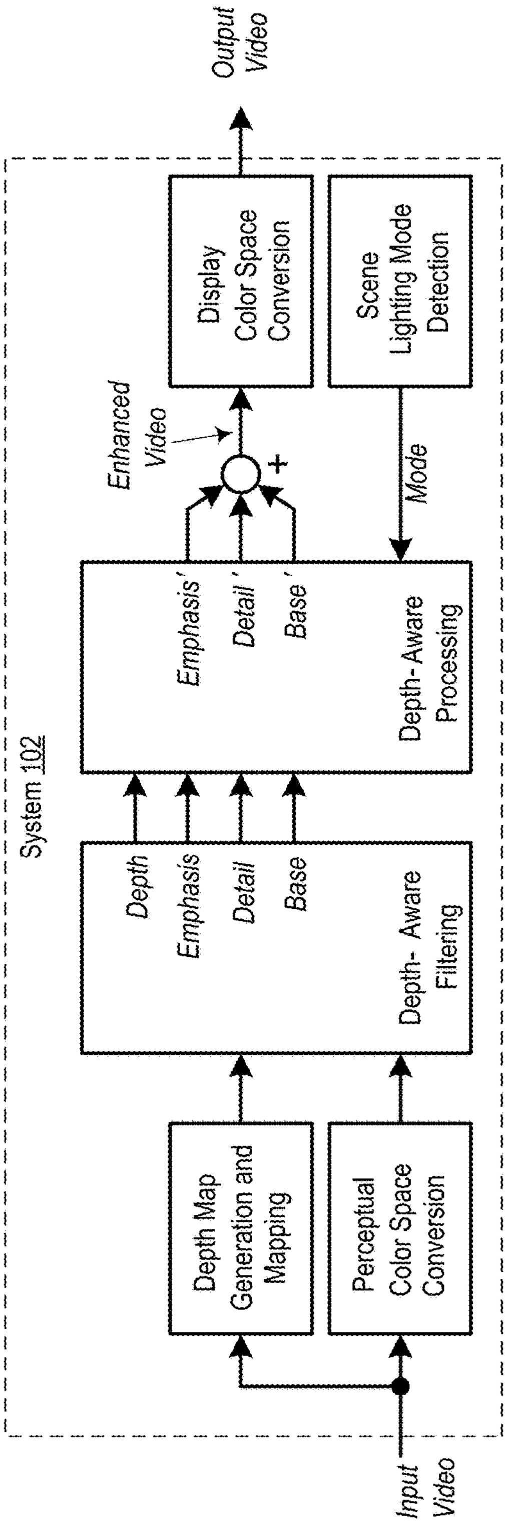
FIGS. 4A and 4B depict block diagrams of other example architectures of the imaging data enhancement system.
Figure 4B:
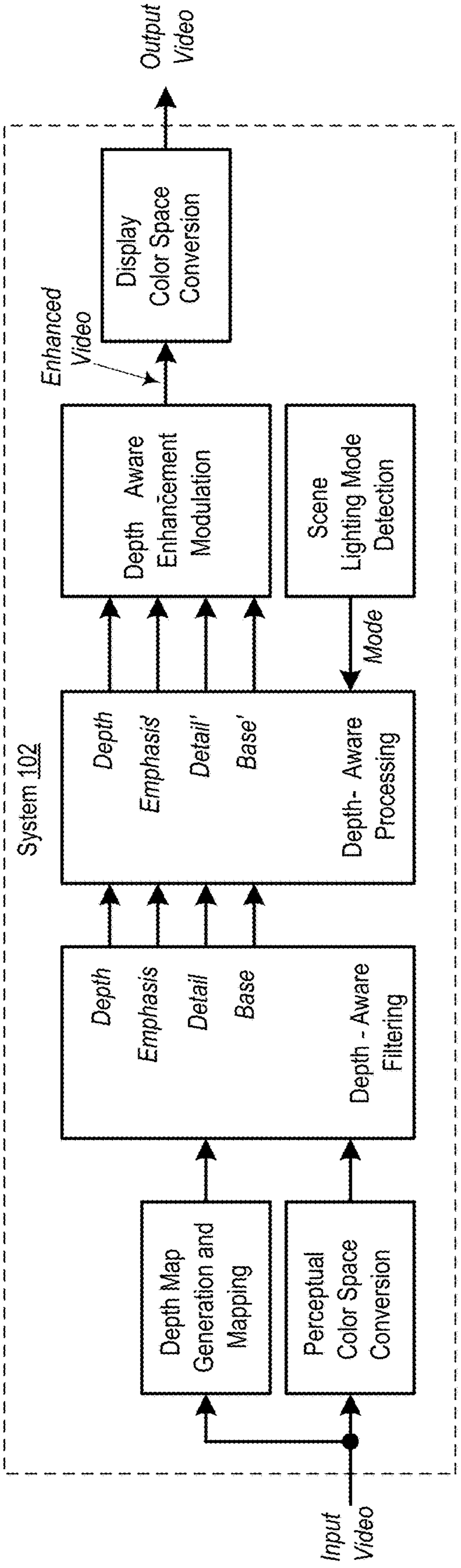

FIGS. 4A and 4B depict block diagrams of other example architectures of the imaging data enhancement system 102. Similarly named components appearing in FIGS. 4A and 4B can be read to operate in a same manner as described with reference to FIGS. 1-3 above and for brevity, are not being described again.

In some implementations, as depicted in FIG. 4A, system 102 can be configured to perform detail-preserving dynamic range compression and dehazing for HDR scenes. In this example, joint 3D spatial-depth-value filtering can be utilized to replace 2D filtering for bilateral filtering or local Laplacian filtering for edge-preserving base-detail decomposition, detail enhancement, and dynamic range compression. Details and local contrast of the overexposed near objects in front-lighted scenes, the underexposed near objects in back-lighted scenes, and the low contrast objects in hazy scenes can be substantially enhanced. An optimal depth-aware filtering kernel can be adaptively adjusted according to the scene lighting mode detected and assigned globally for the whole scene or locally for mixed modes within a scene.

In some implementations, e.g., as depicted in FIG. 4B, system 102 can be configured to perform depth perception enhancement for static 2D single-view displays. In particular, depth-aware video processing can control the edge-dependent shading and counter-shading (halo) effects (such as depth brightening and depth darkening) for 3D perception enhancement. In general, depth-aware video processing can manipulate pictorial depth cues to enhance viewer's depth perception without altering the spatial layouts of input video frames for conventional 2D single-view displays. Pictorial depth cues can include (but are not limited to) relative brightness, contrast and color saturation, aerial perspective, depth of focus, shadow (brightening/darkening), shading, and counter-shading (halo) by the details, textures, and edges.

The processes depicted in FIGS. 4A and 4B differ in at least the handling of the signals output by the depth-aware processing process to generate the enhanced video output. As depicted in FIG. 4A, the depth-aware processing outputs enhanced emphasis signals (Emphasis'), enhanced detail signals (Detail'), and converted base signal (Base'), and utilizes an adder to generate the enhanced video output. As depicted in FIG. 4B, the depth-aware processing outputs enhanced emphasis signals (Emphasis'), enhanced detail signals (Detail'), converted base signal (Base'), and depth values (Depth), and utilizes depth-aware enhancement modulation (e.g., as described with reference to FIG. 2) to generate the enhanced video output.

In some implementations, system 102 can be utilized to perform depth perception enhancement for interactive 2D single-view displays. Among the mass-produced consumer electronics (CE) products, many of smartphones, tablets, personal computers, videophones, doorbell cameras and some of televisions and game consoles support front-facing cameras adjacent to their 2D displays. For CE devices that support front-facing cameras, the algorithms for body/head/face/eye tracking of the dominant viewer (e.g., the user who is nearest to the screen or largest in shape) can be performed on end devices or on cloud side. Motion interaction between the dominant viewer and the displayed scenes can be achieved by spatial modulation of the 3D perception enhancement elements (e.g., shadow, shading, and halo) according to the tracked motion of the dominant viewer and a depth-to-displacement model which can be assigned by viewers or optimized by training (e.g., by a ML model).

In some implementations, processes described herein of the depth-aware enhancement modulation engine 134 can be utilized to enhance 3D perception of motion interaction by tracking of the dominant viewer's (e.g., body, head, face, or center of eyes) position continuously throughout a video session. For real-time video playing, temporal coherence of the estimated dominant viewer's position can be utilized to maintain the stability of the depth-aware enhancement modulation. Large temporal incoherency and inconsistency of the estimated dominant viewer's position can lead to disturbing shaking and flickering artifacts in the resulting output imaging data 136 being output by the imaging data enhancement system 102 for presentation on a display 109 of a user device 104. Therefore, temporal filtering of the estimated dominant viewer's position can be applied to stabilize the temporal disturbances resulting from the incorrect measurements.

In some implementations, motion interaction can be integrated as a dynamic effect. Namely, the motion interaction effect can be achieved when the dominant viewer dynamically moves his or her head around its temporal equilibrium position. If the dominant viewer's head stops moving for a certain period of time, such as a few seconds or fractions of a second, the motion interaction effect will gradually vanish until the dominant viewer's head starts to move again from its current temporal equilibrium position. In such implementations, accumulated motion interaction effect are not accumulated over time (i.e., when the dominant viewer's head is off-axis for long period of time) and large instantaneous motion interaction effect can be avoided (i.e., when there are abrupt large swings for the dominant viewer's head), which may result in excessive depth-aware enhancement modulation and cause undesirable visual artifacts.

To implement such temporal decline of the motion interaction effect, the estimated dominant viewer's position may not be directly applied to as the depth-aware enhancement modulation engine 134 for motion interaction. Instead, a temporal filtering mechanism may be included to extract the dynamic components of the estimated dominant viewer's position for motion interaction which can achieve the dynamic motion interaction effect with gradual return to equilibrium.

Motion interaction between the tracked dominant viewer and the displayed scenes can be achieved by spatial modulation of the 3D perception enhancement elements (e.g., shadow, shading, and halo) according to the tracked motion of the dominant viewer and a depth-to-displacement model which can be assigned by viewers or optimized by training of a machine-learned model. In the imaging data enhancement system 102, the perception enhancement engine 122 can use tracked body/head/face/eye coordinates 210 from the body/hcad/facc/eye tracking engine 132 to spatially modulate the Detail' and Emphasis' signals according to the depth values 202 to generate an enhancement signal to be added to Base' signal in the depth-aware enhancement modulation engine 134 to generate an enhanced video signal 212. An optimal depth to displacement model for spatially modulating enhanced video signal according to the tracked body/head/face/eye coordinates 210 can be set by users with fine-tuned control parameter values or trained by optimization subject to pre-defined constraints.

In some implementations, the spatial modulation can be achieved by grid warping of the Detail' and Emphasis' signals according to the Depth signal and the estimated 2D coordinates 210 (or a temporally filtered version) of a dominant viewer's body/head/face/eyes. In other words, the spatial modulation algorithm spatially shifts the Emphasis' signal adjacent to Depth edges so that the neighboring pixels in the Emphasis' signal closer to the Depth edge move along the direction of the dominant viewer's body/head/face/eyes movements for negative swings of Emphasis' signal and move against the direction of the dominant viewer's body/head/face/eyes movements for positive swings of Emphasis' signal. Similarly, the spatial modulation algorithm also spatially shifts the Detail' signal adjacent to Detail' edges so that the neighboring pixels in the Detail' signal closer to the Detail' edges move along the direction of the dominant viewer's body/head/face/eyes movements for negative swings of Detail' signal and move against the direction of the dominant viewer's body/head/face/eyes movements for positive swings of Detail' signal. Other rules for spatial modulation the Detail' and Emphasis' signals are also possible without deviation from the scope of the current disclosure.

The spatial modulation described above can be achieved by image warping. For example, by first calculating the warping vectors at each grid points at the original uniform grid, generating the warped grids, and then resampling the Detail' and Emphasis' images from their respective warped grids to the original uniform grid. Resampling provides output Detail' and Emphasis' images with the same uniform sampling grid of the input Detail' and Emphasis' images.

In some implementations, system 102 can be utilized to perform backward compatibility for stereo/multi-view displays for viewers with or without wearing stereoscopic eyeglasses. Naked-eye viewers can see depth perception enhanced video with no binocular disparity between their eyes. Viewers wearing active or passive stereoscopic eyeglasses can see depth perception enhanced video with binocular disparity between their eyes on shadow, shading, and counter-shading (halo) by the details, textures, and edges. A dominant viewer (e.g., the user who is nearest to the screen or largest in shape) being tracked can also enjoy motion interaction with or without wearing stereoscopic eyeglasses. With backward compatibility, a same stereo/multi-view display screen can be simultaneously shared by dominant and non-dominant viewers with or without wearing stereoscopic eyeglasses while avoiding any "ghost artifacts" due to stereo parallax.

In some implementations, system 102 can be utilized to perform 1-to-1, 1-to-N, and N-to-N video conferencing by cloud-computing. Body/head/face/eye tracking and depth map generation can be performed in the cloud for cameras at all edge devices. Depth-aware filtering/processing and perception enhancement can be performed in the cloud for displays at all edge devices. In some implementations, additional information such as depth maps may not be necessary to be transmitted from any edge devices. In some implementations, processes such as depth-aware filtering/processing may not be necessary to be performed at any edge devices. Processes described herein may be suitable for 1-to-1, 1-to-N, and N-to-N video conferencing, where motion interaction support benefits from low network latency.

Example Processes of the Imaging Data Enhancement System

Figure 5A:
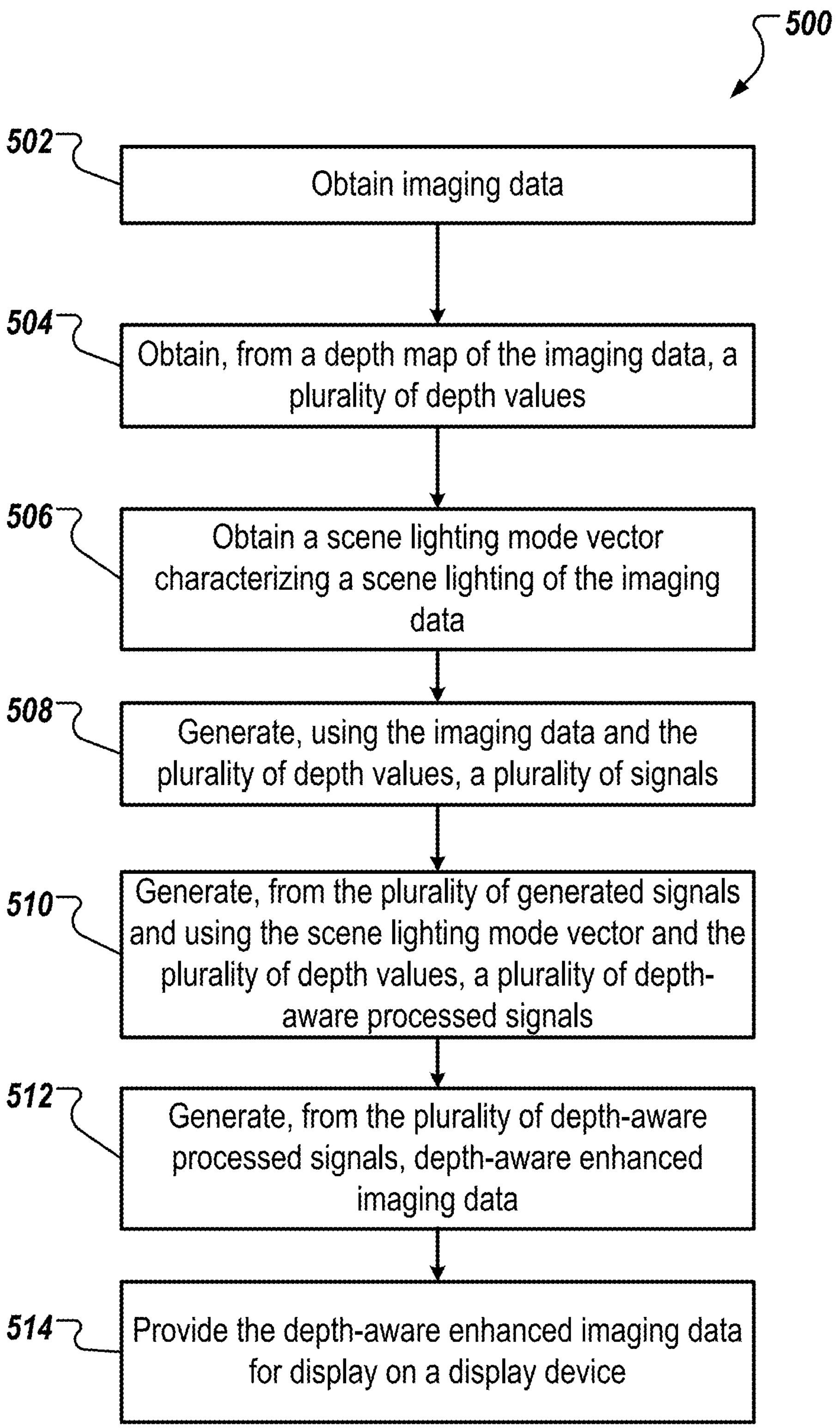
FIGS. 5A and 5B are flow diagrams of example processes performed by the imaging data enhancement system.

FIG. 5A is a flow diagram of an example process 500. The imaging data enhancement system 102 obtains imaging data (502). The imaging data enhancement system 102 can receive imaging data 114, e.g., video and/or images, captured by a camera 107 of a user device 104, for example, as described with reference to FIG. 1. The imaging data 114 can additionally or alternatively be obtained from imaging data database 116, e.g., a repository of imaging data 114 captured by one or more cameras 107.

The system obtains, from a depth map of the imaging data, multiple depth values (504). The imaging data enhancement system 102 can obtain depth map(s) corresponding to the imaging data 114, e.g., a respective depth map for each frame of multiple frames for a video, e.g., as described with reference to FIGS. 1 and 2. The depth values for the depth map(s) may be available from a source of the imaging data 114, e.g., from a camera software for a camera that captured the imaging data 114. In some implementations, the imaging data enhancement system 102 can generate depth map(s) corresponding to the imaging data 114, e.g., using a depth-map generation engine 124. Depth values can be obtained from the depth map generated by the depth-map generation engine 124, e.g., a depth value for each pixel of a frame or image of the imaging data 114, where the depth values represent a depth of respective surfaces included in each pixel within the respective frame/image. The depth values for the depth map(s) can additionally or alternatively be obtained from depth map database 117, e.g., a repository of depth map(s) pre-generated by the depth map generation engine 124 for input imaging data 114 and/or depth map(s) received by the system associated with imaging data 114 (e.g., pre-generated depth map(s)).

The system obtains a scene lighting mode vector characterizing a scene lighting of the imaging data (506). Scene lighting mode vector can be generated, for example, by a scene lighting mode detection engine 126 of the imaging data enhancement system 102, e.g., as described with reference to FIG. 1 and FIG. 3. In some implementations, one or more machine-learned models can be trained, e.g., using supervised learning with scene-mode data pairs, to identify a scene lighting mode based on one or more of mean brightness, mean relative contrast, shadow pixel counts, and specular pixel counts with respect to a depth histogram for each depth bin (using the depth values from the depth map for the image/frame). The scene lighting mode detection engine 126 can output an estimated L-dimensional scene lighting mode vector including a probability/likelihood for corresponding scene lighting mode(s) for the scene, e.g., assigned globally for the scene or assigned locally such that the scene includes two or more lighting modes within the scene.

The system generates, using the imaging data and the multiple depth values, multiple signals (508). The imaging data enhancement system 102 receives as input imaging data 114 and the multiple depth values for the depth map(s) corresponding to the imaging data 114 (e.g., a respective depth map corresponding to each frame of a video) and performs base-detail decomposition utilizing a joint 3D spatial-depth-value filtering to generate detail and base signals, e.g., as described with reference to FIGS. 1 and 2. The imaging data enhancement system 102 further generates, utilizing depth edge filtering, emphasis signals. In some implementations, multiscale detail signals and multiscale emphasis signals are generated.

The system generates, from the multiple generated signals and using the scene lighting mode vector and the multiple depth values, multiple depth-aware processed signals (510). The imaging data enhancement system 102 performs depth-aware processing of the multiple generated signals, e.g., depth-aware edge emphasis modulation 204, depth-aware detail gain modulation 206, and depth-aware base contrast conversion 208 to generate the corresponding depth-aware enhanced edge emphasis signals, depth-aware enhanced detail signals, and depth-aware converted base signal, e.g., as described with reference to FIGS. 1-3.

The system generates, from the multiple depth-aware processed signals, depth-aware enhanced imaging data (512). The imaging data enhancement system 102 utilizes depth-aware enhancement modulation 134 to combine the depth-aware enhanced edge emphasis signals, depth-aware enhanced detail signals, and depth-aware converted base signal as well as the depth values to generate enhanced imaging data, e.g., as described with reference to FIGS. 1, 2, 4A-4B. In some implementations, the system obtains coordinate data tracking one or more of body/head/face/eye positions of a dominant viewer of a display to spatially modulate the depth-aware enhanced edge emphasis signals and depth-aware enhanced detail signals based on the depth values of the depth map and the tracked coordinate data to generate enhanced imaging data which may improve 3D depth perception and supporting motion interaction of the displayed scenes based on a dominant viewer position relative to a display.

The system provides the depth-aware enhanced imaging data for display on a display device (514). The enhanced imaging data may be processed by a post-processing engine 130 of the imaging data enhancement system 102 to perform display color space conversion on the enhanced imaging data. The imaging data enhancement system 102 provides the output imaging data 136 for presentation on a display 109 of a user device 104, e.g., as described with reference to FIGS. 1, 2 and 4A-4B.

Figure 5B:
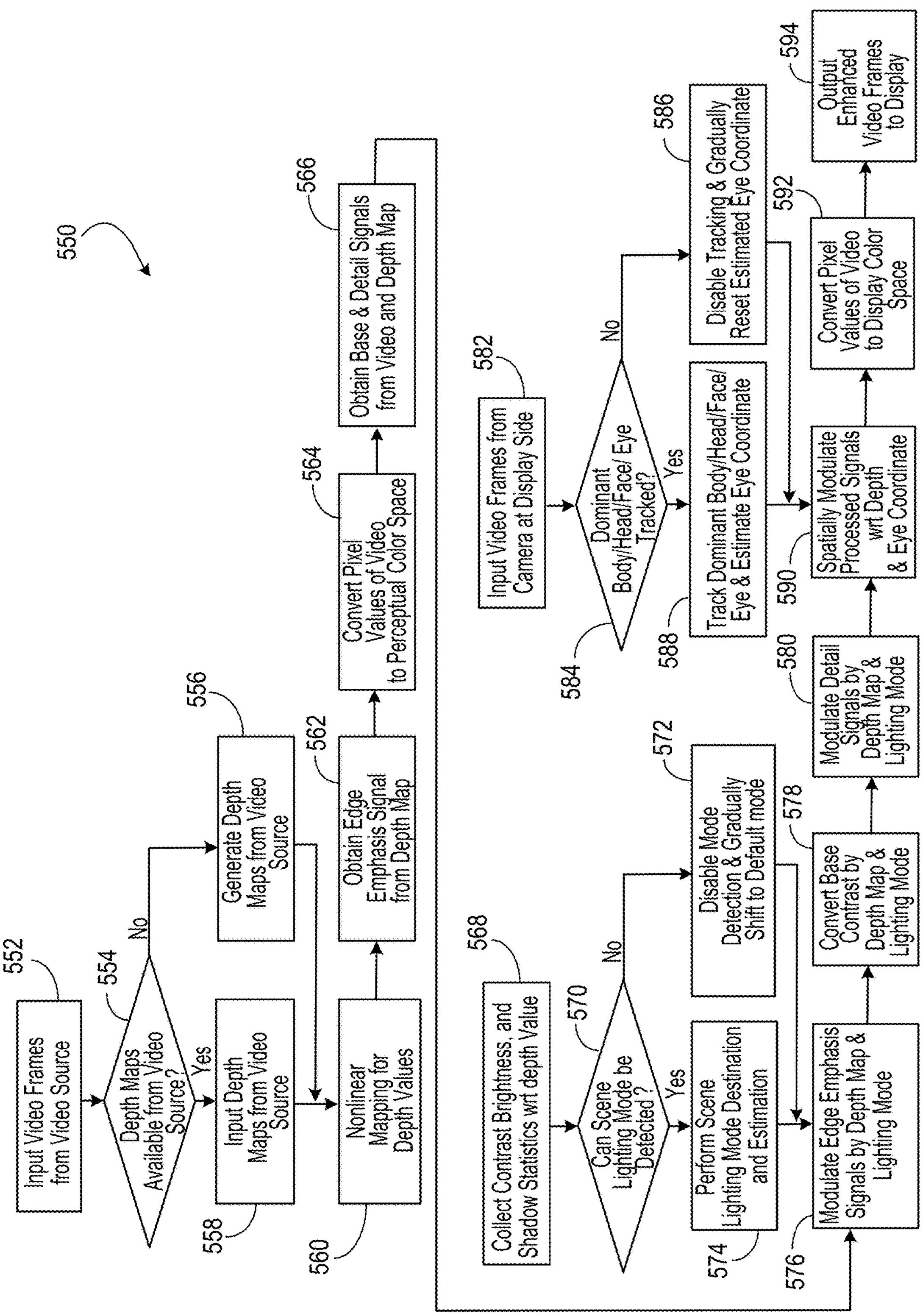

In some implementations, system 102 can be utilized to generate enhanced video data for display on one or more displays of respective user devices, e.g., during video conference call between two or more users. FIG. 5B is a flow diagram of an example process 550 of the imaging data enhancement system 102 for enhancing video/image data. The process 550 described herein can be implemented between two user devices, each user device including a respective display and respective camera, for example, to provide spatially modulated enhanced video to each viewer engaged in a video conference call on a respective display based on a position of the respective viewers with respect to their display.

The imaging data enhancement system 102 obtains input video frames from a video source (552). The video frames (i.e., imaging data 114) can be, for example, video captured during a video conference call using a first camera 107 of a first user device 104 with a first display 109 (e.g., a web camera in data communication with a computer).

The imaging data enhancement system 102 determines if depth maps are available for the video source (554) and, in response to determining that the depth maps are not available for the video source, generates depth maps for the video frames of the video (556), e.g., as described with reference to step 504 in FIG. 5 above.

In response to determining that the depth maps are available from the video source, the system can input the depth maps from the video source (558). The system generates a nonlinear mapping for the depth values obtained from the depth map(s) for the video frame(s) (560), and utilizes a depth edge filtering process to obtain edge emphasis signal(s) from the depth map(s) for the video frame(s) (562). The system may covert pixel values for the video frame(s) to perceptual color space (564). Alternatively, the system may receive converted pixel values for the video frame(s) to perceptual color space, for example, where the input video is pre-processed before it is received by the system 102 (e.g., by a component of a camera capturing the imaging data). Base and detail signals are obtained by the imaging data enhancement system 102 from the video and depth map(s) using base-detail decomposition by applying a joint 3D spatial-depth-value filtering process (566).

The system collects contrast, brightness, and shadow statistics with respect to depth values of a depth map corresponding to a video frame of the multiple video frames (568), e.g., as described with reference to step 506 of FIG. 5A, and determine whether scene lighting mode can be detected (570) from the collected pixel statistics with respect to the histogram of the nonlinearly mapped depth values, e.g., mean brightness per bin, mean relative contrast per bin, shadow pixel counts per bin, specular pixel counts per bin, and total pixel counts per bin. In the case where the scene lighting mode is determined to be undetectable, the scene lighting mode can be disabled and a default lighting mode can be applied gradually to avoid any undesirable abrupt changes of the output enhanced video frames (572). A default lighting mode can be assigned according to metadata from video sources, application/scene types, use cases, system function setting, user preferences, or a combination thereof. In the case where the scene lighting mode is determined to be detectable, the imaging data enhancement system 102 can perform scene light mode detection and estimation (574).

The system modulates the edge emphasis signal(s) based on the depth values of the depth map and the determined scene lighting mode vector to generate depth-aware enhanced edge emphasis signal(s) (576). The system converts the base contrast signal based on the depth values of the depth map and the scene lighting mode vector to generate a depth-aware converted base signal (578). The system modulates the detail signal(s) based on the depth values of the depth map and the scene lighting mode vector to generate depth-aware enhanced detail signal(s) (580).

The system receives input video frames from a camera at a display side (582). In other words, from a user device 104 including a camera 107 and a dominant viewer that is viewing the display 109 of the user device 104. The system can determine if coordinate data defining one or more of body/head/face/eye positions of a dominant viewer is tracked (584), and in response to determining that the coordinate data is not being tracked, disable tracking and gradually reset estimated body/head/face/eye coordinates to a default value (e.g., to avoid any undesirable shaking of the output enhanced video frames) (586). In general, the default value for the estimated body/head/face/eye coordinates can be set to a value that will disable the depth-aware enhancement modulation for motion interaction. In response to determining that the coordinate data is tracked, the system can track one or more of the body/head/face/eye positions of the dominant viewer and estimate coordinates of the dominant viewer's eyes (588).

The imaging data enhancement system 102 can spatially modulate depth-aware processed signals, i.e., depth-aware enhanced edge emphasis signal(s) and depth-aware enhanced detail signal(s), with respect to the depth values of the depth map and the estimated (or default) coordinates of the dominant viewer's body/head/face/eyes to generate an enhanced video signal 212 (590). The system can convert pixel values of the enhanced video signal 212 to display color space (592) and output the enhanced video frames to the display (594).

In some implementations, processes 500 and 550 can be utilized for bidirectional depth-aware enhancement modulations, e.g., for video conferencing. In some implementations, the processes 500 and 550 can be utilized for depth-aware enhancement modulation for motion interaction for unidirectional applications, e.g., for watching TV programs or viewing pre-recorded videos.

Operations of processes 500 and 550 are described herein as being performed by the system described and depicted in FIGS. 1-4. Operations of the processes 500 and 550 are described above for illustration purposes only. Operations of the processes 500 and 550 can be performed by any appropriate device or system, e.g., any appropriate data processing apparatus, such as, e.g., the imaging data enhancement system 102 or the user device 104. Operations of the processes 500 and 550 can also be implemented as instructions stored on a non-transitory computer readable medium. Execution of the instructions cause one or more data processing apparatus to perform operations of the processes 500 and 550.

Figure 6:
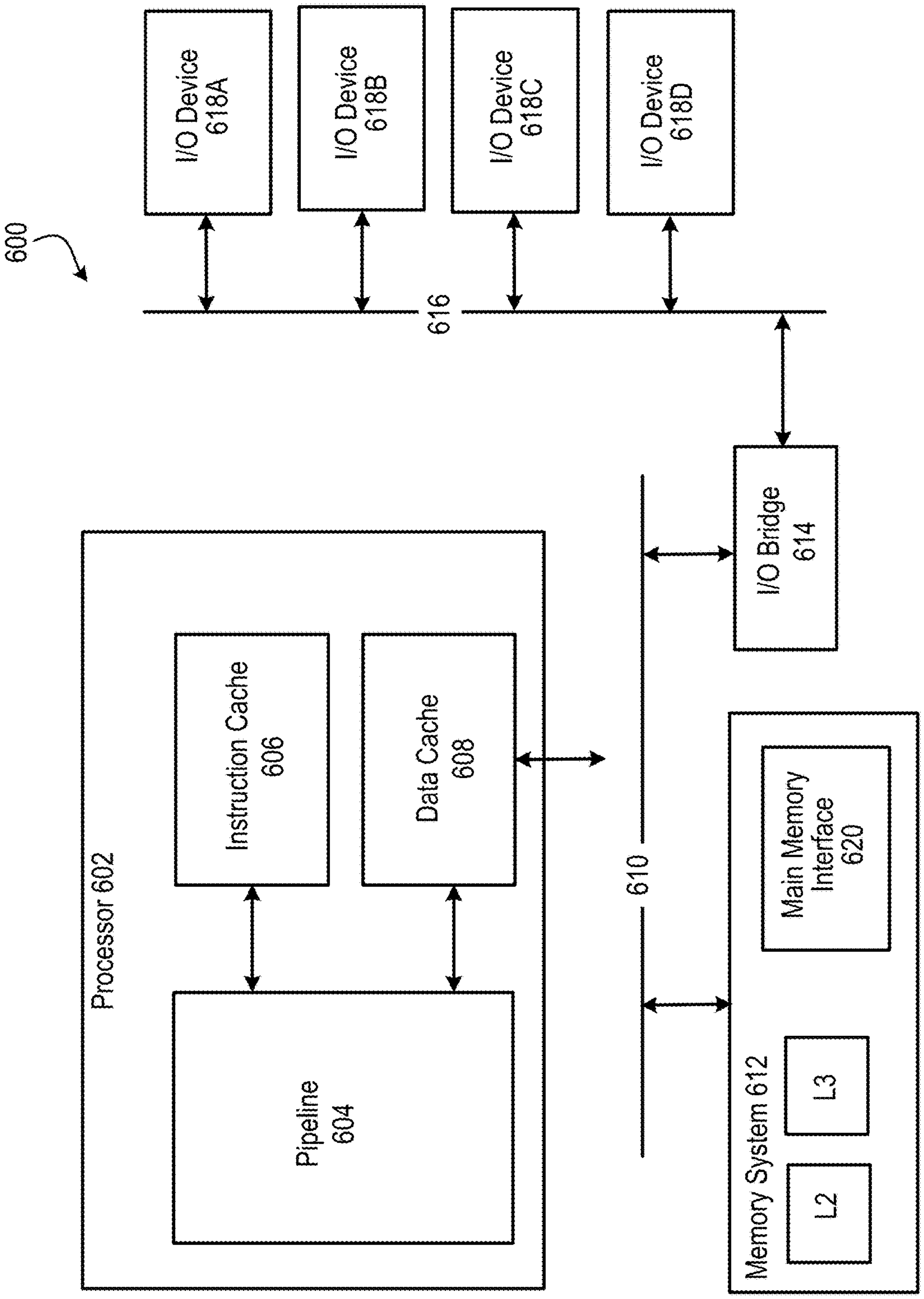
FIG. 6 shows an example of a computing system in which the microprocessor architecture disclosed herein may be implemented.

FIG. 6 shows an example of a computing system in which the microprocessor architecture disclosed herein may be implemented. The computing system 600 includes at least one processor 602, which could be a single central processing unit (CPU) or an arrangement of multiple processor cores of a multi-core architecture. In the depicted example, the processor 602 includes a pipeline 604, an instruction cache 606, and a data cache 608 (and other circuitry, not shown). The processor 602 is connected to a processor bus 610, which enables communication with an external memory system 612 and an input/output (I/O) bridge 614. The I/O bridge 614 enables communication over an I/O bus 616, with various different I/O devices 618A-618D (e.g., disk controller, network interface, display adapter, and/or user input devices such as a keyboard or mouse).

The external memory system 612 is part of a hierarchical memory system that includes multi-level caches, including the first level (L1) instruction cache 606 and data cache 608, and any number of higher level (L2, L3, . . . ) caches within the external memory system 612. Other circuitry (not shown) in the processor 602 supporting the caches 606 and 608 includes a translation lookaside buffer (TLB), various other circuitry for handling a miss in the TLB or the caches 606 and 608. For example, the TLB is used to translate an address of an instruction being fetched or data being referenced from a virtual address to a physical address, and to determine whether a copy of that address is in the instruction cache 606 or data cache 608, respectively. If so, that instruction or data can be obtained from the L1 cache. If not, that miss is handled by miss circuitry so that it may be executed from the external memory system 612. It is appreciated that the division between which level caches are within the processor 602 and which are in the external memory system 612 can differ in various examples. For example, an L1 cache and an L2 cache may both be internal and an L3 (and higher) cache could be external. The external memory system 612 also includes a main memory interface 620, which is connected to any number of memory engines (not shown) serving as main memory (e.g., Dynamic Random Access Memory engines).

Figure 7:
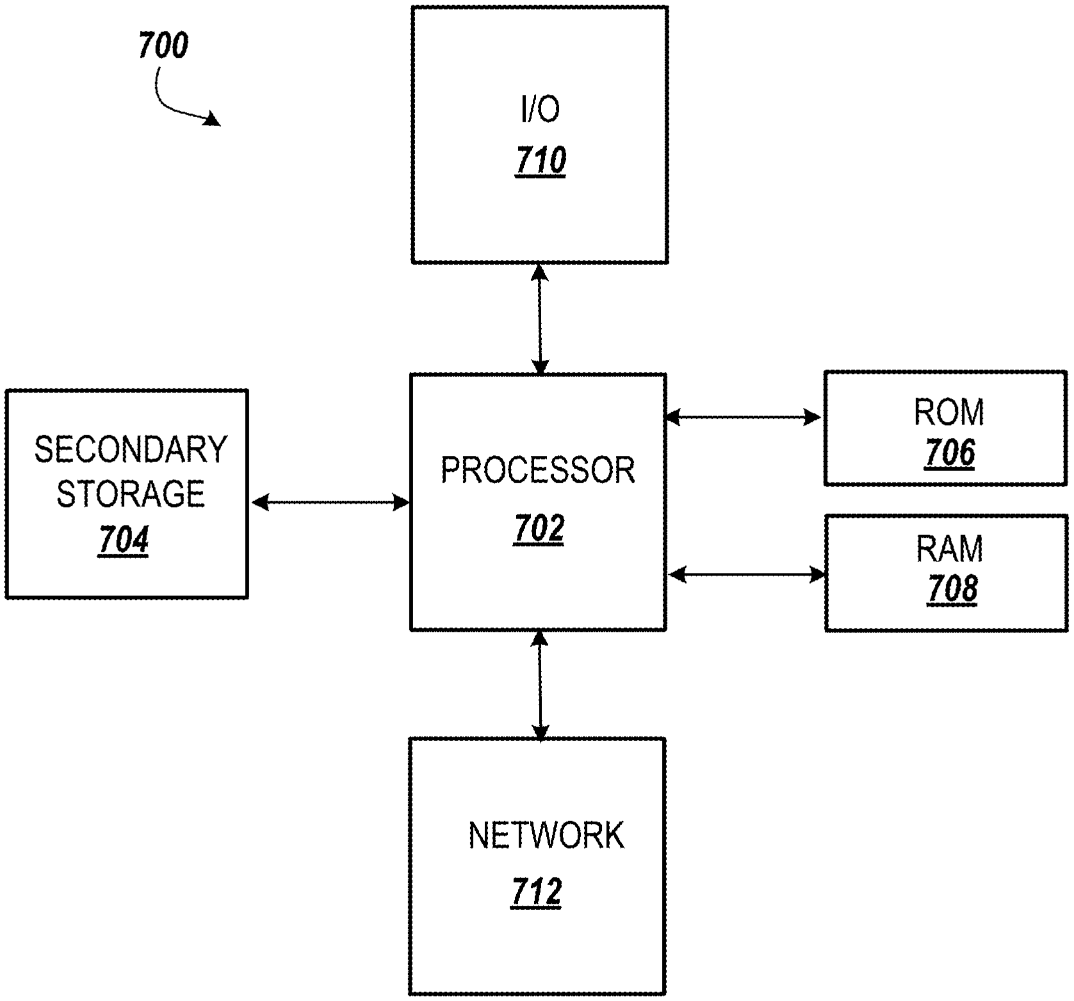
FIG. 7 illustrates a schematic diagram of a general-purpose network component or computer system.

FIG. 7 illustrates a schematic diagram of a general-purpose network component or computer system. The general-purpose network component or computer system includes a processor 702 (which may be referred to as a central processor unit or CPU) that is in communication with memory devices including secondary storage 704, and memory, such as ROM 706 and RAM 708, input/output (I/O) devices 710, and a network 712, such as the Internet or any other well-known type of network, that may include network connectively devices, such as a network interface. Although illustrated as a single processor, the processor 702 is not so limited and may comprise multiple processors. The processor 702 may be implemented as one or more CPU chips, cores (e.g., a multi-core processor), FPGAs, ASICs, and/or DSPs, and/or may be part of one or more ASICs. The processor 702 may be configured to implement any of the schemes described herein. The processor 702 may be implemented using hardware, software, or both.

The secondary storage 704 is typically comprised of one or more disk drives or tape drives and is used for non-volatile storage of data and as an over-flow data storage device if the RAM 708 is not large enough to hold all working data. The secondary storage 704 may be used to store programs that are loaded into the RAM 708 when such programs are selected for execution. The ROM 706 is used to store instructions and perhaps data that are read during program execution. The ROM 706 is a non-volatile memory device that typically has a small memory capacity relative to the larger memory capacity of the secondary storage 704. The RAM 708 is used to store volatile data and perhaps to store instructions. Access to both the ROM 706 and the RAM 708 is typically faster than to the secondary storage 704. At least one of the secondary storage 704 or RAM 708 may be configured to store routing tables, forwarding tables, or other tables or information disclosed herein.

It is understood that by programming and/or loading executable instructions onto the node 700, at least one of the processor 720 or the memory 722 are changed, transforming the node 700 in part into a particular machine or apparatus, e.g., a router, having the novel functionality taught by the present disclosure. Similarly, it is understood that by programming and/or loading executable instructions onto the node 700, at least one of the processor 702, the ROM 706, and the RAM 708 are changed, transforming the node 700 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design.

Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The technology described herein can be implemented using hardware, firmware, software, or a combination of these. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program engines or other data. Examples of computer readable storage media include RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program engines or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this disclosure, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:

obtaining imaging data;

obtaining a depth map including a plurality of depth values for the imaging data and a scene lighting mode vector characterizing a scene lighting of the imaging data;

generating, using the plurality of depth values, a plurality of edge emphasis signals by a depth edge filtering process;

generating, using the imaging data and the plurality of depth values, a plurality of detail signals and a base signal by a joint three-dimensional (3D) spatial-depth-value filtering process;

generating a plurality of depth-aware processed signals, from the plurality of edge emphasis signals, the plurality of detail signals, and the base signal, and using the scene lighting mode vector and the plurality of depth values, and a nonlinear emphasis amplitude modulation by:

applying, to the plurality of edge emphasis signals and utilizing emphasis gain values obtained from the scene lighting mode vector, a nonlinear emphasis amplitude modulation to generate the depth-aware enhanced edge emphasis signals; and applying, to the plurality of detail signals and utilizing detail gain values obtained from the scene lighting mode vector, a nonlinear detail amplitude modulation to generate the depth-aware enhanced detail signals, wherein the plurality of depth-aware processed signals comprise depth-aware enhanced edge emphasis signals, depth-aware enhanced detail signals, and depth-aware enhanced imaging data;

generating, from the plurality of depth-aware processed signals, the depth-aware enhanced imaging data; and providing the depth-aware enhanced imaging data for display on a display device.

2. The method of claim 1, further comprising:

generating, from the imaging data, the depth map of the imaging data; and determining, using the depth map, the plurality of depth values.

3. The method of claim 1, further comprising:

obtaining, coordinate data defining positions of one or more of i) a body ii) a head iii) a face and iv) eye(s) of a dominant viewer of a display of a user device by a camera.

4. The method of claim 3, wherein generating, from the plurality of depth-aware processed signals, depth-aware enhanced imaging data further comprises:

generating, based on the coordinate data, a spatial modulation of the depth-aware enhanced imaging data, wherein the spatial modulation of the depth-aware enhanced imaging data specifies modification of one or more of shadow, shading, and halo of the depth-aware enhanced imaging data.

5. The method of claim 1, wherein obtaining the scene lighting mode vector comprises:

generating, from the imaging data and depth values from the depth map of the imaging data, the scene lighting mode vector.

6. The method of claim 1, further comprising:

converting pixel values of the imaging data to a perceptual color space prior to generating the plurality of edge emphasis signals, the plurality of detail signals, and the base signal; and converting pixel values of the depth-aware enhanced imaging data to a display color space prior to providing the depth-aware enhanced imaging data for display.

7. One or more non-transitory computer-readable media coupled to one or more processors and having instructions stored thereon which, when executed by the one or more processors, cause the one or more processors to perform operations comprising:

obtaining imaging data;

obtaining a depth map including a plurality of depth values for the imaging data and a scene lighting mode vector characterizing a scene lighting of the imaging data;

generating, using the plurality of depth values, a plurality of edge emphasis signals by a depth edge filtering process;

generating, using the imaging data and the plurality of depth values, a plurality of detail signals and a base signal by a joint three-dimensional (3D) spatial-depth-value filtering process;

converting pixel values of the imaging data to a perceptual color space prior to generating the plurality of edge emphasis signals, the plurality of detail signals, and the base signal;

converting pixel values of the depth-aware enhanced imaging data to a display color space prior to providing the depth-aware enhanced imaging data for display;

generating a plurality of depth-aware processed signals, from the plurality of edge emphasis signals, the plurality of detail signals, and the base signal, and using the scene lighting mode vector and the plurality of depth values, and a nonlinear emphasis amplitude modulation, wherein the plurality of depth-aware processed signals comprise depth-aware enhanced edge emphasis signals, depth-aware enhanced detail signals, and depth-aware enhanced imaging data;

generating, from the plurality of depth-aware processed signals, the depth-aware enhanced imaging data; and providing the depth-aware enhanced imaging data for display on a display device.

8. The computer-readable media of claim 7, further comprising:

generating, from the imaging data, the depth map of the imaging data; and determining, using the depth map, the plurality of depth values.

9. The computer-readable media of claim 7, further comprising:

obtaining, coordinate data defining positions of one or more of i) a body ii) a head iii) a face and iv) eye(s) of a dominant viewer of a display of a user device by a camera.

10. The computer-readable media of claim 7, wherein generating, from the plurality of depth-aware processed signals, depth-aware enhanced imaging data further comprises:

generating, based on the coordinate data, a spatial modulation of the depth-aware enhanced imaging data, wherein the spatial modulation of the depth-aware enhanced imaging data specifies modification of one or more of shadow, shading, and halo of the depth-aware enhanced imaging data.

11. The computer-readable media of claim 7, wherein obtaining the scene lighting mode vector comprises:

generating, from the imaging data and depth values from the depth map of the imaging data, the scene lighting mode vector.

12. The computer-readable media of claim 7, wherein generating the plurality of depth-aware processed signals comprising the depth-aware enhanced edge emphasis signals and depth-aware enhanced detail signals comprises:

applying, to the plurality of edge emphasis signals and utilizing emphasis gain values obtained from the scene lighting mode vector, a nonlinear emphasis amplitude modulation to generate the depth-aware enhanced edge emphasis signals; and applying, to the plurality of detail signals and utilizing detail gain values obtained from the scene lighting mode vector, a nonlinear detail amplitude modulation to generate the depth-aware enhanced detail signals.

13. A system, comprising:

one or more processors; and a computer-readable media device coupled to the one or more processors and having instructions stored thereon which, when executed by the one or more processors, cause the one or more processors to perform operations comprising:

obtaining imaging data;

obtaining a depth map including a plurality of depth values for the imaging data and a scene lighting mode vector characterizing a scene lighting of the imaging data;

generating, using the plurality of depth values, a plurality of edge emphasis signals by a depth edge filtering process;

generating, using the imaging data and the plurality of depth values, a plurality of detail signals and a base signal by a joint three-dimensional (3D) spatial-depth-value filtering process;

generating a plurality of depth-aware processed signals, from the plurality of edge emphasis signals, the plurality of detail signals, and the base signal, and using the scene lighting mode vector and the plurality of depth values, and a nonlinear emphasis amplitude modulation by:

applying, to the plurality of edge emphasis signals and utilizing emphasis gain values obtained from the scene lighting mode vector, a nonlinear emphasis amplitude modulation to generate the depth-aware enhanced edge emphasis signals; and applying, to the plurality of detail signals and utilizing detail gain values obtained from the scene lighting mode vector, a nonlinear detail amplitude modulation to generate the depth-aware enhanced detail signals, wherein the plurality of depth-aware processed signals comprise depth-aware enhanced edge emphasis signals, depth-aware enhanced detail signals, and depth-aware enhanced imaging data;

generating, from the plurality of depth-aware processed signals, the depth-aware enhanced imaging data; and providing the depth-aware enhanced imaging data for display on a display device.

14. The system of claim 13, further comprising:

generating, from the imaging data, the depth map of the imaging data; and determining, using the depth map, the plurality of depth values.

15. The system of claim 13, further comprising:

obtaining, coordinate data defining positions of one or more of i) a body ii) a head iii) a face and iv) eye(s) of a dominant viewer of a display of a user device by a camera, wherein generating, from the plurality of depth-aware processed signals, depth-aware enhanced imaging data further comprises:

generating, based on the coordinate data, a spatial modulation of the depth-aware enhanced imaging data, wherein the spatial modulation of the depth-aware enhanced imaging data specifies modification of one or more of shadow, shading, and halo of the depth-aware enhanced imaging data.

16. The system of claim 13, wherein obtaining the scene lighting mode vector comprises:

generating, from the imaging data and depth values from the depth map of the imaging data, the scene lighting mode vector.

17. The system of claim 13, further comprising:

converting pixel values of the imaging data to a perceptual color space prior to generating the plurality of edge emphasis signals, the plurality of detail signals, and the base signal; and converting pixel values of the depth-aware enhanced imaging data to a display color space prior to providing the depth-aware enhanced imaging data for display.

* * * * *